United States Patent
Hayes

(10) Patent No.: US 12,413,944 B2
(45) Date of Patent: Sep. 9, 2025

(54) COMPUTING DEVICE AND METHOD FOR FACILITATING AUTOMATED PROVISIONING OF MOBILE DEVICES

(71) Applicant: Bryodyn Technologies LLC, Herndon, VA (US)

(72) Inventor: Chad S. Hayes, Herndon, VA (US)

(73) Assignee: Bryodyn Technologies LLC, Herndon, VA (US)

( * ) Notice: Subject to any disclaimer, the term of this patent is extended or adjusted under 35 U.S.C. 154(b) by 381 days.

(21) Appl. No.: 18/042,512

(22) PCT Filed: Aug. 27, 2021

(86) PCT No.: PCT/US2021/048097
§ 371 (c)(1),
(2) Date: Feb. 22, 2023

(87) PCT Pub. No.: WO2022/047257
PCT Pub. Date: Mar. 3, 2022

(65) Prior Publication Data
US 2023/0328493 A1    Oct. 12, 2023

Related U.S. Application Data

(60) Provisional application No. 63/071,094, filed on Aug. 27, 2020.

(51) Int. Cl.
*G06F 16/93* (2019.01)
*G06F 3/0484* (2022.01)
*H04W 4/50* (2018.01)

(52) U.S. Cl.
CPC ............ *H04W 4/50* (2018.02); *G06F 3/0484* (2013.01)

(58) Field of Classification Search
CPC ......... H04W 4/50; G06F 3/0484; G06F 16/93
See application file for complete search history.

(56) References Cited

U.S. PATENT DOCUMENTS

| 2015/0119113 A1 | 4/2015 | Deasy et al. |
| 2018/0184275 A1* | 6/2018 | Doyijode ............ G06K 19/0723 |

(Continued)

OTHER PUBLICATIONS

International Search Report and Written Opinion issued Dec. 1, 2021 in Intl. Appl. No. PCT/US21/48097.

*Primary Examiner* — Joseph E Dean, Jr.
(74) *Attorney, Agent, or Firm* — MEDLER FERRO WOODHOUSE & MILLS PLLC

(57) ABSTRACT

A computing device and method for provisioning mobile devices with electronic content is provided. The method includes determining a set of content identifiers which identify multiple pieces of electronic content, generating a GUI that presents the set of content identifiers, and receiving a provisioning request associated with a selected piece of electronic content or associated with a content collection. The method further includes querying an operating system or a peripheral device management module of the computing device for a list of mobile devices connected to the computing device, and provisioning the list of mobile devices with the selected piece of electronic content or the content collection by provisioning a first mobile device in the list, determining whether the list has remaining mobile devices which have not been provisioned, and sequentially provisioning the remaining mobile devices.

18 Claims, 20 Drawing Sheets

(56) References Cited

U.S. PATENT DOCUMENTS

2018/0246626 A1    8/2018  Lounibos et al.
2019/0349725 A1   11/2019  Macaluso
2020/0145496 A1*   5/2020  Jain ........................ H04W 4/50

* cited by examiner

Database Module 3121B

| Content Identifier | Content Type | Membership in Content Collection |
|---|---|---|
| "fortient-vpn.apk" | Application | Mission "ZYX", "UST" |
| "Blue-Email-Client.apk" | Application | None |
| "Baghdad-Google-Maps-2m.sqlite" | Map Imagery Database File | Mission "ZYX" |
| "MapboxLight.xml" | Map Source File | Mission "RPO" |
| "Baghdad-Google-Sat-5m.sqlite" | Map Imagery Database File | Mission "UST", "RPO" |
| "atak.p12" | Other File | None |
| "MapboxDark.xml" | Map Source File | Mission "ZYX", "RPO" |
| ... | | |

FIG. 3C

Database Module 3121B

| Collection Identifier | Collection Membership |
|---|---|
| "ZYX" | "fortient-vpn.apk", "Baghdad-Google-Maps-2m.sqlite", "MapboxDark.xml" |
| "UST" | "fortient-vpn.apk", "Baghdad-Google-Sat-5m.sqlite" |
| "RPO" | "MapboxLight.xml", "Baghdad-Google-Sat-5m.sqlite", "MapboxDark.xml" |

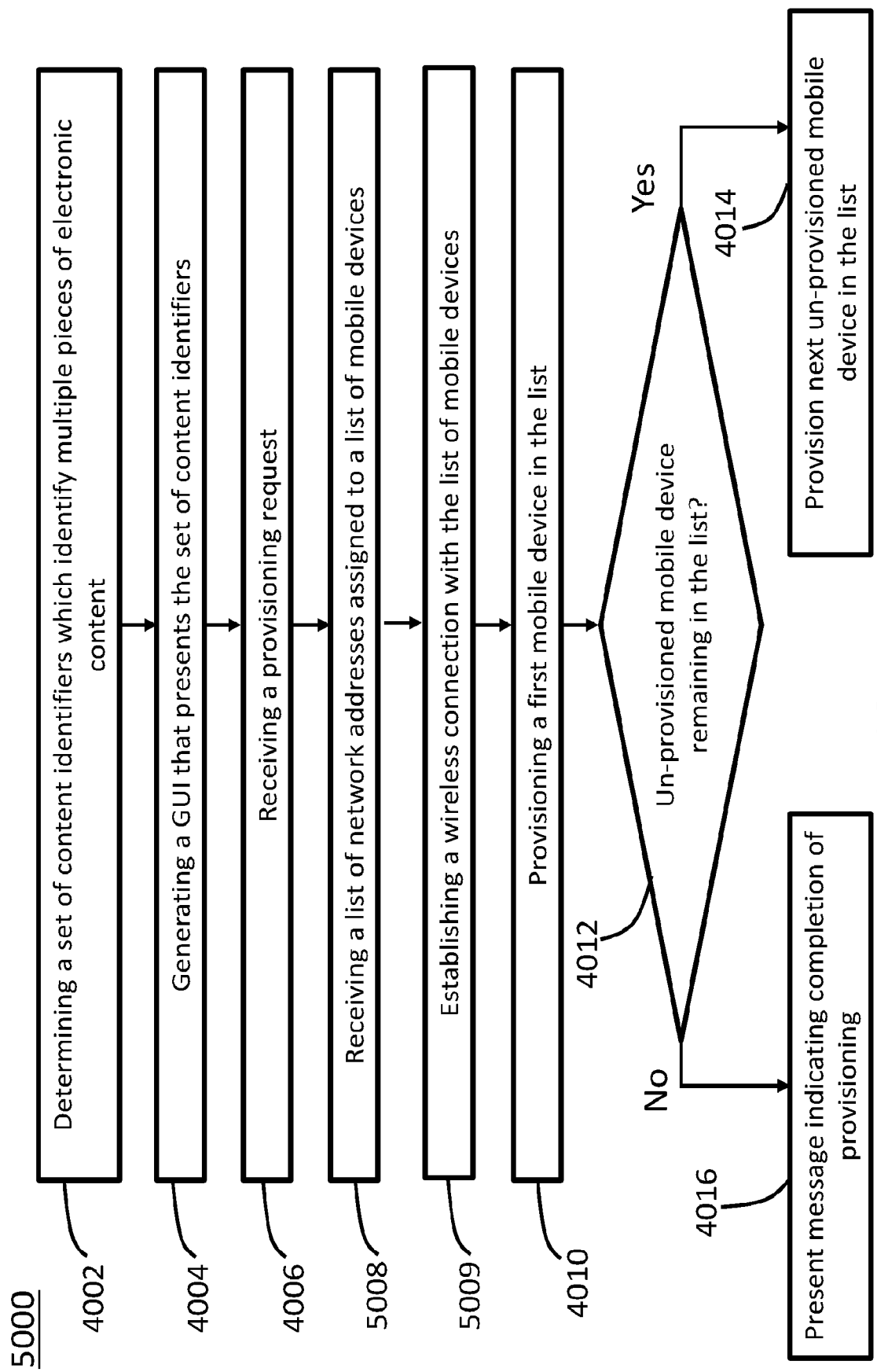

COMPUTING DEVICE AND METHOD FOR FACILITATING AUTOMATED PROVISIONING OF MOBILE DEVICES

CROSS REFERENCE TO RELATED APPLICATION(S)

The present application claims priority to U.S. Provisional Application 63/071,094, filed Aug. 27, 2021 and entitled "COMPUTING DEVICE AND METHOD FOR FACILITATING AUTOMATED PROVISIONING OF MOBILE DEVICES," the entire content of which is incorporated by reference herein.

FIELD OF THE INVENTION

The present invention is directed to a computing device and method for facilitating automated provisioning of mobile devices.

BACKGROUND

When a mobile device is used by a user to serve a particular mission, the mobile device may be provisioned with various electronic content, such as applications and/or data. This provisioning may be done manually, such as by manually transferring application files to the mobile device and then installing the application files, or by manually transferring data files to a particular folder on the mobile device.

SUMMARY

One aspect of the present disclosure relates to a method and a computing system for provisioning mobile devices with electronic content. The method may be performed by the computing device. The method may comprise determining a set of content identifiers which identify multiple pieces of electronic content that are stored on the computing device or are accessible by the computing device. Each of the multiple pieces of electronic content may be a respective application file or data file. The method may further include generating a graphical user interface (GUI) that presents the set of content identifiers which identify the multiple pieces of electronic content. The method may further include receiving, from a user via the GUI, a provisioning request associated with a piece of electronic content selected from the multiple pieces of electronic content, or associated with a content collection which has a subset of the multiple pieces of electronic content. The provisioning request may be for requesting the piece of electronic content or the content collection to be available for use on one or more mobile devices. The method further comprises querying, in response to receiving the provisioning request, an operating system of the computing device or a peripheral device management module of the computing device for a list of mobile devices which identify all mobile devices connected to the computing device via a wired communication interface. The method may further comprise provisioning the list of mobile devices with the selected piece of electronic content or the content collection by: (a) provisioning a first mobile device in the list with the selected piece of electronic content or the content collection by transferring, via the wired communication interface, the piece of electronic content or content collection to the first mobile device in a manner which causes the piece of electronic content or content collection to be available for use on the first mobile device; (b) determining, after the first mobile device has been provisioned with the piece of electronic content or content collection, whether the list has one or more remaining mobile devices which have not been provisioned with the piece of electronic content or content collection; and (c) in response to a determination that the list includes the one or more remaining mobile devices which have not been provisioned, sequentially provisioning the one or more remaining mobile devices with the piece of electronic content or content collection by transferring, via the wired communication interface, the piece of electronic content or content collection to the one or more remaining mobile devices in the manner which causes the piece of electronic content or content collection to be available for use on the one or more remaining mobile devices.

One aspect of the present disclosure relates to a method and a computing device for provisioning mobile devices with electronic content. The method may be performed by the computing device. The method may comprise determining a set of content identifiers which identify multiple pieces of electronic content. The method may further comprise generating a graphical user interface (GUI) that presents the set of content identifiers which identify the multiple pieces of electronic content. The method may further comprise receiving, from a user via the GUI, a provisioning request associated with a piece of electronic content selected from the multiple pieces of electronic content, or associated with a content collection which has a subset of the multiple pieces of electronic content. The method further comprises receiving a list of network addresses which are assigned to a list of mobile devices, wherein the list of network addresses are associated with a wireless communication network. The method further comprises establishing a wireless connection with the list of mobile devices via the wireless communication network, wherein the wireless connection is established based on the list of network addresses. The method further comprises provisioning the list of mobile devices with the selected piece of electronic content or the content collection by: (a) provisioning a first mobile device in the list with the selected piece of electronic content or the content collection by transferring, via the wireless communication network, the piece of electronic content or content collection to the first mobile device in a manner which causes the piece of electronic content or content collection to be available for use on the first mobile device; (b) determining, after the first mobile device has been provisioned with the piece of electronic content or content collection, whether the list has one or more remaining mobile devices which have not been provisioned with the piece of electronic content or content collection; and (c) in response to a determination that the list includes the one or more remaining mobile devices, sequentially provisioning the one or more remaining mobile devices with the piece of electronic content or content collection by transferring, via the wireless communication network, the piece of electronic content or content collection to the one or more remaining mobile devices in the manner which causes the piece of electronic content or content collection to be available for use on the one or more remaining mobile devices.

BRIEF DESCRIPTION OF THE DRAWINGS

FIGS. 3C and 3D illustrate examples of a database sub-module for managing a database which identifies a pool of pieces of electronic content which are available for provisioning mobile devices, according to an embodiment hereof.

FIG. 5 illustrates an example method for automatically provisioning multiple mobile devices with a selected piece of electronic content or a content collection via a wireless communication network, according to an embodiment hereof.

DETAILED DESCRIPTION

Figure 1A:
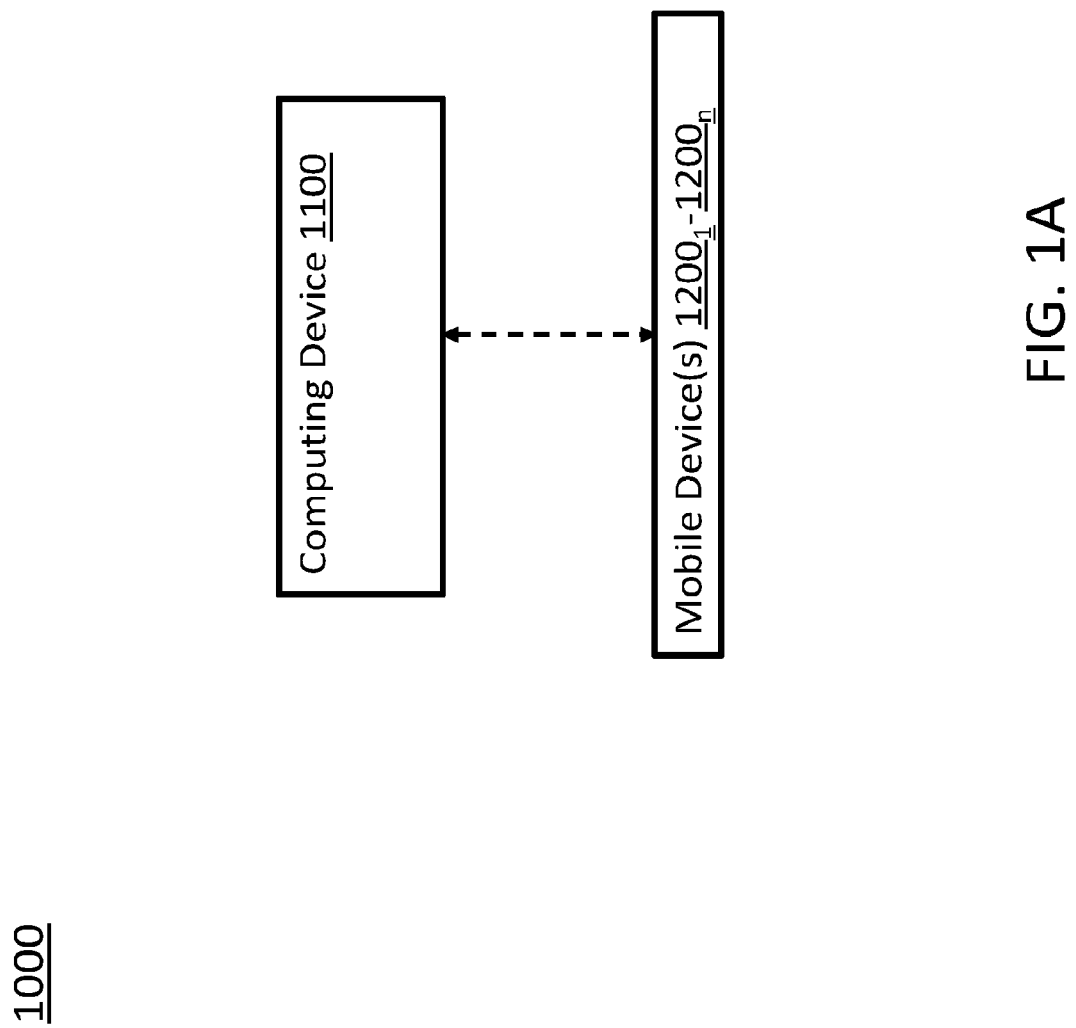
FIGS. 1A-1E illustrate examples of systems or environments in which a computing system provisions mobile devices with pieces of electronic content, according to embodiments herein.

One aspect of the present disclosure relates to a provisioning module, also referred to as a provisioning tool (e.g., Mission Builder), which provides a more automated manner for mass provisioning mobile devices (e.g., phone or tablet computer), especially mobile devices running the Android™ operating system. Provisioning the mobile devices may involve, e.g., preparing the mobile devices so that they have desired functionality and/or desired data to support a particular purpose, such as a particular mission, which may involve using the mobile devices at a specific geographic region and/or using the mobile devices to accomplish specific tasks. For instance, the provisioning of the mobile devices may involve transferring or otherwise providing various pieces of electronic content (e.g., files) to the mobile devices. The transferred files may provide, e.g., executable applications, map data sets, images, digital certificates for encryption, application configuration files, or other electronic content. In some implementations, the provisioning module may provide a graphical user interface (GUI) to facilitate the combining and assembling of files or other pieces of electronic content into collections or packages. These collections or packages, also referred to as content collections, may include content which is relevant to a particular purpose, such as a particular mission. The mobile devices may then be provisioned with an entire content collection, including all of the pieces of electronic content which belong to that content collection.

Although the provisioning may be performed manually, on a device-by-device basis, such manual provisioning may be extremely time-consuming, labor-intensive, and prone to human error. For example, the number of mobile devices which would need to be provisioned for some mission may be on the order of dozens of devices or hundreds of devices. In such an example, the mobile devices can be manually provisioned by, e.g., a user manually installing various applications on one of the mobile devices and transferring various data to the mobile device, and then manually repeating this process for the remaining dozens or hundreds of mobile devices. Although the user can attempt to perform or control such a process via a software development tool, or more generally a mobile device interface module, such as the Android™ Debug Bridge (ADB), such a software development tool requires specialized knowledge and/or training to set up the ADB environment and to use its commands and command-line interface, and still involves much manual intervention to specify which applications and which data are to be provided to a particular mobile device, and further may be affected by the likelihood of human error or inconsistency during the manual provisioning of dozens or hundreds of mobile devices. The entire manual provisioning process may in some scenarios take a user many days to complete, which can make the preparation of the mobile devices for a particular mission or purpose more costly and time-intensive.

As stated above, one aspect of the present disclosure relates to providing a provisioning module to assist users in the mass provisioning of mobile devices, especially Android™ mobile devices. The provisioning tool may provide an intuitive graphical user interface (GUI) that creates a structured front-end for managing a large pool of electronic content which are available for provisioning mobile devices, and for assigning different pieces of electronic content or combination of pieces to different content collections, wherein the content collections may be tailored to various missions. The provisioning tool may further provide a back-end for interfacing with mobile devices or with a software development tool such as ADB, and may cause the mobile devices to be provisioned with electronic content which was selected by a user.

In an embodiment, the provisioning module may be configured to automatically provision a list of mobile devices which are connected to a computing device via a wired communication interface (e.g., USB) or a wireless communication network. For instance, the provisioning module may be configured to perform a query which identifies all mobile devices connected to the computing device via the wired communication interface, and to automatically provision all of the mobile devices in the list in an iterative manner, with minimal or no user intervention. More particularly, once the provisioning module provisions one mobile device, it may determine whether the list includes any remaining mobile device which is still un-provisioned, and automatically provision the remaining mobile device. Further, the provisioning module may automatically repeat this process until all mobile devices have been provisioned.

In an embodiment, the provisioning tool may further provide a device cleanup functionality, which may be performed, e.g., after a mission is complete and the mobile devices are returned by the mission personnel. In some scenarios, provisioning the mobile devices may involve using certain device configurations that may affect the security of those devices. For instance, the provisioning may involve switching the mobile devices to a state in which USB debugging is enabled. Such a state may facilitate the automated provisioning of the mobile devices, but may later leave them more vulnerable in a security context. In such scenarios, the provisioning tool may provide a device cleanup functionality that switches the mobile devices to a state in which Developer Options and USB debugging are disabled, which may increase the security of the mobile devices and limit access to them. This cleanup functionality may be executed prior to the mobile devices going out on a mission.

Accordingly, in the above examples, the provisioning module provides a tool for configuring and managing the provisioning of devices so as to keep mission data synchronized and available in a timely manner to all devices needing the mission data. More specific details of the provisioning tool and its environment are discussed below.

Figure 1B:
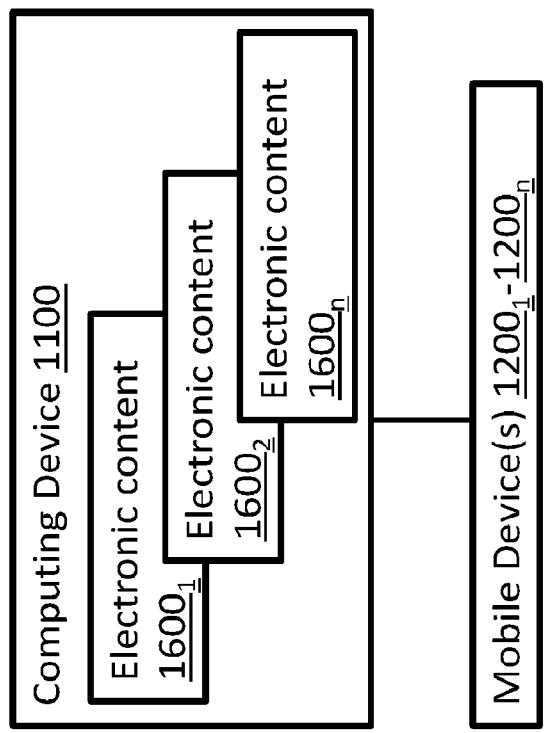
Figure 1C:
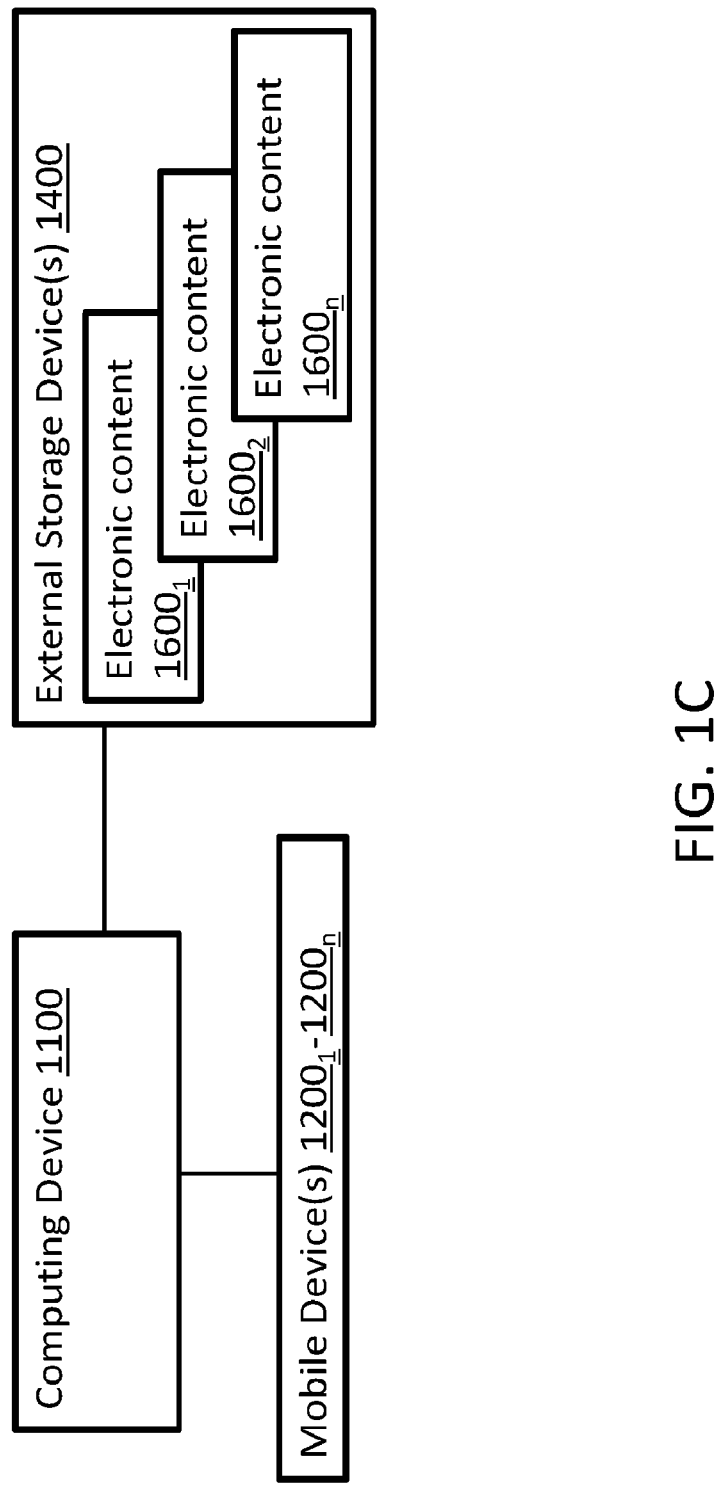

FIG. 1A provides a block diagram of a system 1000 for automatically provisioning one or more mobile devices. The system 1000 includes a computing device 110, which may also be referred to as a provisioning computing device, and one or more mobile devices $1200_1$-$1200_n$, or more generally end user devices. As discussed below in more detail, the computing device 1100 may be a desktop computer, laptop computer, or other computing device which is configured to execute a provisioning module (also referred to as a provisioning tool) for provisioning the one or more mobile devices $1200_1$-$1200_n$. In an embodiment, the one or more mobile devices $1200_1$-$1200_n$ may be one or more mobile phones or tablet computers, and may be provisioned with digital resources, such as pieces of electronic content. In one example, the one or more mobile devices $1200_1$-$1200_n$ may each be an Android™ device, as discussed below in more detail. In some instances, the electronic content may refer to, e.g., applications and/or data, such that the provisioning module on the computing device 1100 may be configured to provision the one or more mobile devices with applications and/or data. In such instances, the various pieces of electronic content may each be a file, such as an application file and/or a data file. The provisioning module in such instances may be configured to cause application files and/or data files to be uploaded or otherwise transferred to the one or more mobile devices $1200_1$-$1200_n$. The files or other pieces of electronic content may be stored on the computing device, or stored on a storage device which is external to the computing device. For instance, FIG. 1B depicts an example in which the computing device 1100 stores various pieces $1600_1$-$1600_n$ of electronic content (e.g., application files and/or data files), and may be able to transfer a user-selected piece of electronic content or a user-selected collection of pieces of electronic content to the mobile devices $1200_1$-$1200_n$. FIG. 1C illustrates another example in which the various pieces $1600_1$-$1600_n$ of electronic content are stored on one or more external storage devices 1400 (or, more generally, non-transitory computer-readable media) which are in communication with and accessible by the computing device 1100. The one or more external storage devices 1400 in this example may each be, e.g., an external hard drive, a server, or some other storage device, and the computing device 1100 may be configured to route a selected piece of electronic content or a selected collection of pieces of electronic content from the one or more external storage devices 1400 to the mobile devices $1200_1$-$1200_n$. In some implementations, the embodiment of FIG. 1B may be combined with the embodiment of FIG. 1C, such that some pieces of electronic content may be stored on the computing device 1100, while some other pieces of electronic content may be stored on the one or more external storage devices 1400.

Figure 1D:
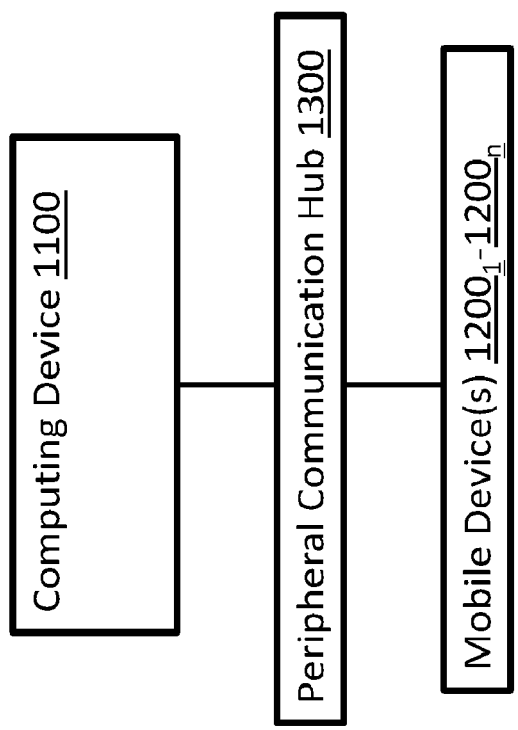

As discussed above, the computing system 1100 may be configured to communicate with the mobile devices $1200_1$-$1200_n$ via a wired or wireless communication medium, wherein using such a medium to establish communication between the computing system 1100 and the mobile devices $1200_1$-$1200_n$ may be referred to as connecting the computing system 1100 and the mobile devices $1200_1$-$1200_n$. In an embodiment, the computing device 1100 may be configured to communicate with the mobile devices $1200_1$-$1200_n$ via a peripheral device communication interface. In some instances, the peripheral device communication interface may be a wired communication interface, such as a universal serial bus (USB) interface. For instance, the mobile devices $1200_1$-$1200_n$ may be directly connected to USB ports of the computing device 1100 via USB cables. In another example, the mobile devices $1200_1$-$1200_n$ may be indirectly connected to the computing device 1100 via an intermediate device. More specifically, FIG. 1D illustrates a scenario in which the mobile devices $1200_1$-$1200_n$ are indirectly connected to the computing device 1100 via a peripheral communication hub 1300, such as a USB hub. The computing device 1100 in this example may be configured to execute a peripheral device management module, such as a USB controller, which is configured to communicate with the mobile devices $1200_1$-$1200_n$ directly or via the hub 1300 after the mobile devices $1200_1$-$1200_n$ have been connected to the computing device 1100.

Figure 1E:
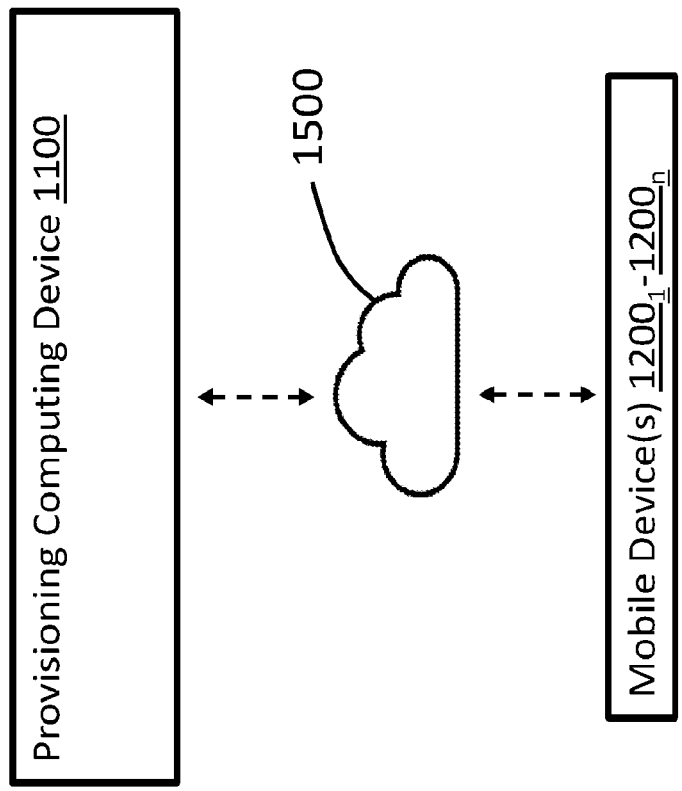

As stated above, the computing device 1100 may in some embodiments communicate with the mobile devices $1200_1$-$1200_n$ via a wireless medium. For example, FIG. 1E illustrates an example in which computing device 1100 may be connected to the mobile devices $1200_1$-$1200_n$ via a wireless network 1500, such as an IEEE 802.11 network.

Figure 2:
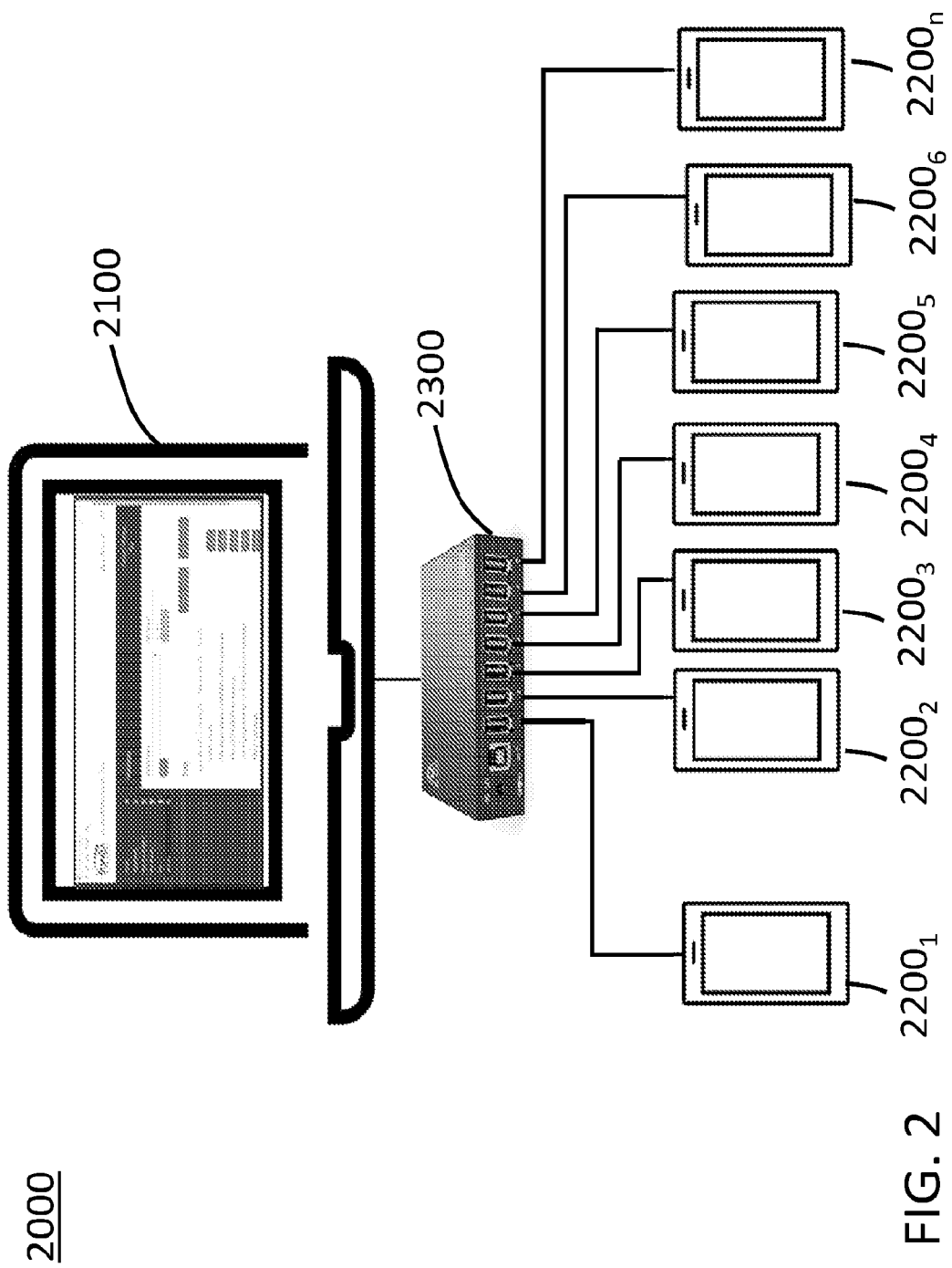
FIG. 2 illustrates an example system or environment in which a computing system provisions mobile devices with pieces of electronic content via a wired communication interface, according to embodiments herein.

FIG. 2 depicts a more specific example of a system 2000 (which may be an embodiment of the system 1000) for providing provisioning mobile devices. In the example of FIG. 2, a computing device 2100 may be configured to provision multiple mobile devices $2200_1$-$2200_n$. The computing device 2100 may be a laptop (e.g., executing the Windows® or Linux operating system) configured to execute a provisioning module (which is discussed below in more detail), while the mobile devices $2200_1$-$2200_n$ may be phones or tablet computers executing the Android™ operating system. In one example, the mobile devices may be Samsung® Galaxy® S9 and S20 Tactical Edition phones, Samsung KNOX enabled phones, and/or Nokia or Motorola phones executing the Android™ operating system. In another example, other phones may be used. In these examples, the computing device 2100 may be connected to the mobile devices $2200_1$-$2200_n$ via a USB hub 2300.

Figure 3A:
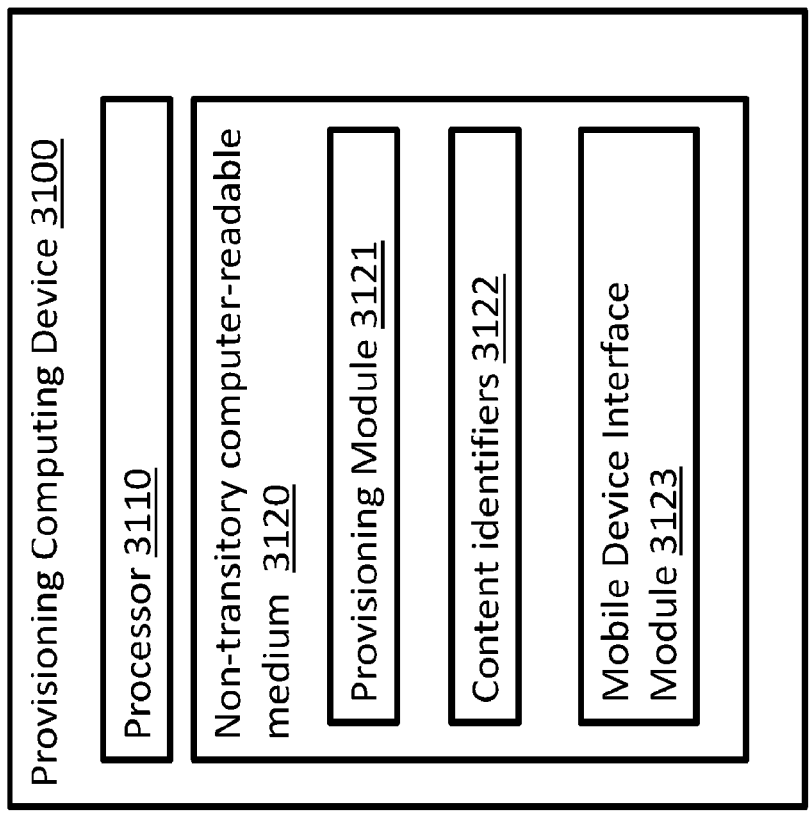
FIGS. 3A and 3B illustrate examples of a computing system for provisioning mobile devices, according to an embodiment hereof.

FIG. 3A depicts a block diagram of a computing device 3100, which may be an embodiment of the computing device 1100. The computing device 3100 may include at least one processor 3110 and a non-transitory computer-readable medium 3120. The non-transitory computer-readable medium 3120 may be any storage device, such as computer memory (e.g., computer RAM), a hard disk drive (HDD), a solid state drive, or any other storage device. The non-transitory computer-readable medium 3120 may be configured to store data and/or instructions executable by the at least one processor 3110, wherein the instructions may define a program, application, or other module. For instance, the non-transitory computer-readable medium 3120 may store code or other instructions for a provisioning module 3121, which may be configured to provision mobile devices (e.g., $1200_1$-$1200_n$), such as by performing the steps discussed in FIGS. 4 and 5. In such an instance, the at least one processor 3110 may be configured to run the module by executing the code.

Figure 3B:
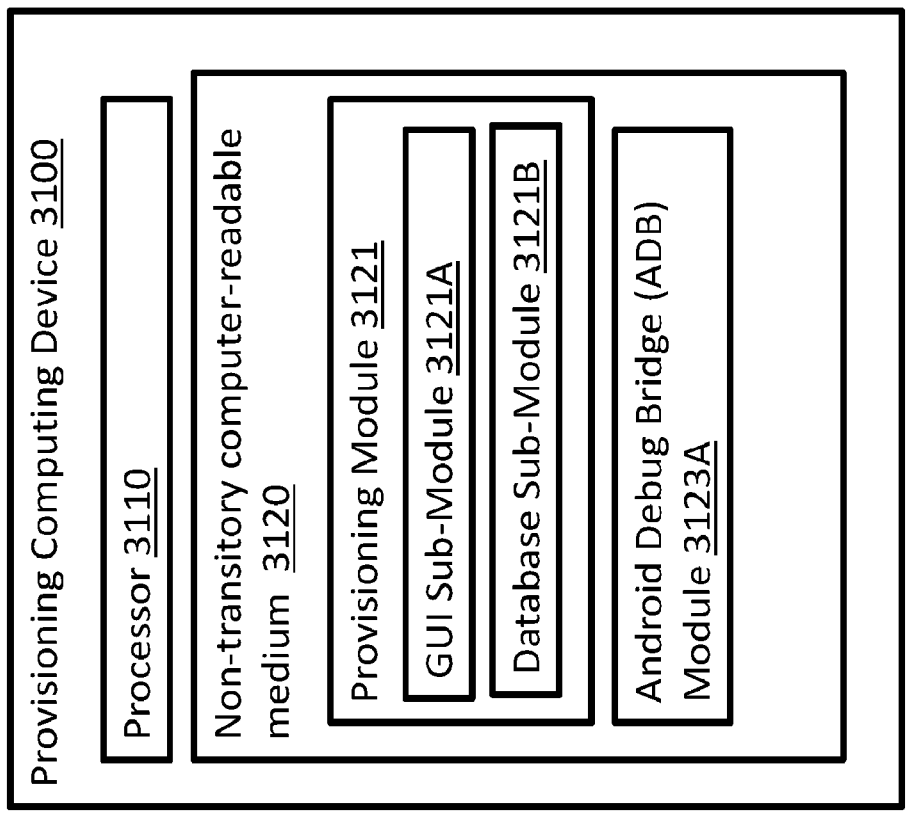

In some implementations, the non-transitory computer-readable medium 3120 may further store a mobile device interface module 3123, which may be configured to interact with mobile devices, such as Android™ devices. In one example, the mobile device interface module 3123 may be the Android Debug Bridge (ADB) module 3123, as illustrated in FIG. 3B. The ADB module 3123A itself may be a developer tool which provides a command line interface for receiving ADB commands from a user, and may include an ADB server module and an ADB client module. In some instances, the provisioning module 3121 may interact or interface with the mobile device interface module 3123. For instance, the provisioning module 3121 may generate commands (e.g., ADB commands) and output the commands to the mobile device interface module 3123. The mobile interface module 3123 (e.g., ADB module) may execute the ADB commands or trigger the mobile devices $1200_1$-$1200_n$ to execute the ADB commands.

In an embodiment, the non-transitory computer-readable medium 3120 may store content identifiers that identify pieces of electronic content which are stored on the computing device 3100 or are accessible by the computing device 3100, or more generally are available for provisioning mobile devices (e.g., $2200_1$-$2200_n$). The content identifiers may form a pool of provision-able content for the mobile devices. If the various pieces of electronic content are application files, data files, and/or other files, the content identifiers may be or may include file names.

In an embodiment, the provisioning module 3121 may be configured to generate a graphical user interface (GUI) for assisting a user in controlling when or how a group of mobile devices are provisioned, and may be configured to maintain a database which tracks information regarding a pool of electronic content which can be used for provisioning the mobile devices. More particularly, as illustrated in FIG. 3B, the provisioning module 3121 may include a GUI sub-module 3121A which is configured to generate the GUI, which is discussed below in more detail, and include a database sub-module 3121B, which is configured to identify a set of content identifiers that identify multiple pieces of electronic content or other digital resources which are available to be used for provisioning mobile devices. FIGS. 3C and 3D depict examples of a database or other data structure maintained by the database module 3121B. The database may identify a pool of content identifiers, or more specifically file names, of various files or other pieces of electronic content which are available for provisioning mobile devices. The various files may include, e.g., Android package (.apk) files, data sets provided by SQLite (.sqlite) files, extensible markup language (.xml) files, and PKCS #12 (.p12) files. In the example of FIG. 3C, the database may identify a content type for each piece of electronic content represented in the database. In some implementations, the database module 3121B may store the database as a Javascript Object Notation (JSON) file.

One aspect of the provisioning module 3121 relates to providing an interface between a user and the ADB module 3123A. More specifically, use of the ADB module 3123A may involve specialized knowledge and setup, and thus may not be suitable for direct use by all users. The provisioning module 3121 may generate the GUI as a front-end interface for interacting with users, and may also provide back-end functionality for interacting with the ADB module 3123A to carry out various functionalities for provisioning mobile devices. The provisioning module 3121 allows a user to focus on interaction with the GUI generated by the GUI sub-module 3121A, rather than having to interface directly with a command-line interface provided by the ADB module 3123A. As discussed below, the provisioning module 3121 may be configured to generate ADB commands based on user interaction with buttons or other user interface elements on the GUI, and to interact with the ADB module 3123A to execute or trigger execution of the ADB commands. The GUI may thus provide a user with an intuitive and user-friendly way for selecting electronic content or other resources for the provisioning of mobile devices and a user-friendly way to request the start of such provisioning, while the provisioning module 3121 may be configured to interface with the ADB module 3123A to automatically execute such provisioning for multiple mobile devices in response to user interaction with the GUI.

One aspect of the present disclosure relates to provisioning mobile devices with a content collection, which may be a package that combines or collects specific pieces of electronic content. The use of such content collections or packages may simplify how mobile devices are provisioned. For instance, a particular package may include a specific combination of multiple pieces of electronic content (e.g., a specific combination of applications, map data set files, licenses, encryption keys, etc.) which are relevant to a particular purpose, such as a particular mission. Rather than having to individually specify each piece of electronic content which is relevant to that particular mission and to repeat this process for each mobile device being provisioned, the user may more simply specify a particular content collection associated with that mission and request that the mobile device be provisioned with the content collection. In an embodiment, the database module 3121B may track content collections and which pieces of electronic content are in a particular content collection. As illustrated in FIG. 3C, the database maintained by the database module 3121B may indicate, for each content identifier stored in the database, whether a piece of electronic content associated with the content identifier is a member of any content collection. For example, the database may indicate that a piece of electronic content having the content identifier "Abc.apk" is a member of the content collection labeled "ZYX" and is also a member of the content collection labeled "UST." As illustrated in FIG. 3D, the database may also store collection identifiers which identify various content collections, and identify which pieces of electronic content are in the content collections.

Figure 3E:
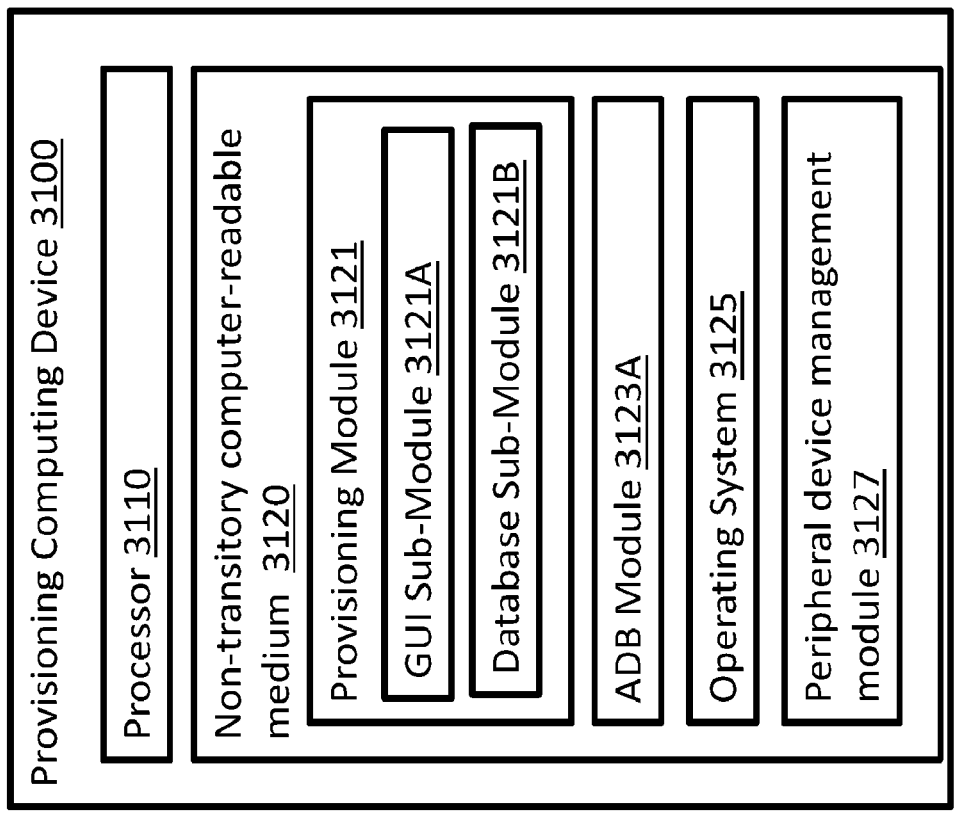
FIG. 3E illustrates an example of a computing system for provisioning mobile devices, according to an embodiment hereof.

FIG. 3E depicts an example in which the mobile device interface module 3123 is an ADB module 3123A. FIG. 3E further depicts the non-transitory computer-readable medium 3120 storing instructions for an operating system 3125 (e.g., Windows® operating system) and a peripheral device management module 3127, such as a USB controller module, which may be configured to manage communication between the computing device 3100 and one or more mobile devices via a peripheral device communication interface (e.g., USB interface).

Figure 4:
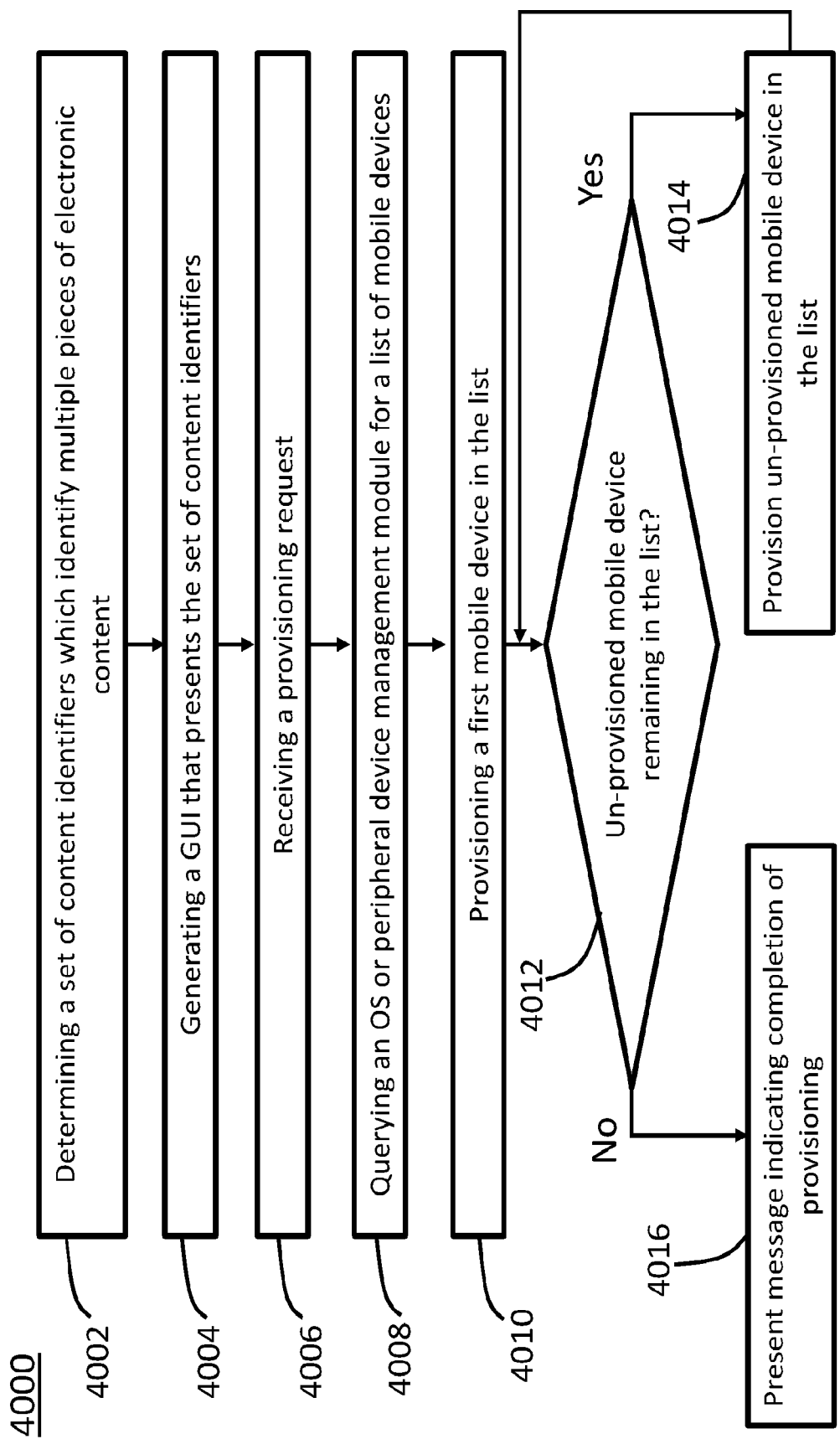
FIG. 4 illustrates an example method for automatically provisioning multiple mobile devices with a selected piece of electronic content or a content collection, according to an embodiment hereof.

FIG. 4 illustrates an example method 4000 which may be performed by the computing device 1100/2100/3100, or more specifically by the at least one processor 3110 while executing the provisioning module 3121, for provisioning mobile devices with electronic content. In an embodiment, the method 4000 includes a step 4002, in which the computing device 1100/2100/3100, or more specifically the provisioning module 3121, determines a set of content identifiers which identify multiple pieces of electronic content that are available for provisioning mobile devices, such as the pieces $1600_1$-$1600_n$ of electronic content in FIGS. 1B and 1C. The set of content identifiers may define a pool of electronic content which is available for provisioning devices. The electronic content may be stored on the computing device 1100/2100/3100, like the scenario illustrated in FIG. 1B, may be stored on a storage device which is accessible by the computing device, like the scenario illustrated in FIG. 1C, or a combination thereof.

In an embodiment, step 4002 may involve accessing a database which is storing the set of content identifiers, and retrieving the set of content identifiers from the database. For instance, FIG. 3C depicts one example of a set of content identifiers which the computing device 1100/2100/3100 may retrieve from the database provided by the database module 3121B. In some instances, each of the multiple pieces of electronic content may be a respective application file or a respective data file. For example, some of the pieces of electronic content may be application files, or more specifically Android package (.apk) files that can be used to install applications on mobile devices, while some other pieces of electronic content may be data files that provide map content, such as map imagery database files (e.g., .sqlite files), or map source data files (e.g., .xml files). In such instances, the content identifiers may be file names.

As stated above, one aspect of the present application relates to providing content collections, each of which groups together certain pieces of electronic content, so as to simplify the process for provisioning a mobile device with a plurality of pieces of electronic content. In some implementations, the computing device 1100/2100/3100 in step 4002 may determine a set of collection identifiers which identify multiple content collections that are stored on the computing device 1100/2100/3100 or are accessible by the computing device 1100/2100/3100. The set of collection identifiers may define a pool of content collections which are available for provisioning mobile devices. FIG. 3D depicts an example of a database which is stored on the computing device 1100/2100/3100 and identifies a plurality of content collections (e.g., three content collections), and identifies which pieces of electronic content are in each of the plurality of content collections. More particularly, the database may include collection identifiers, such as the collection names (also referred to as package names) "ZYX", "UST", and "RPO" that identify the content collections. The database may further associate each of the collection identifiers (e.g., "ZYX") with a set of content identifiers (e.g., file names), wherein a particular collection identifier identifies a content collection, and the set of content identifiers identify pieces of electronic content which belong to the content collection.

Returning to FIG. 4, the method 4002 may in an embodiment include step 4004, in which the computing device 1100/2100/3100, or more specifically the GUI sub-module 3121A of the provisioning module 3121, generates a graphical user interface (GUI) that presents the set of content identifiers, which identify the pool of multiple pieces of electronic content that are available for provisioning mobile devices. FIGS. 6A-6F provide an example of such a GUI, which displays or otherwise presents various content identifiers, as illustrated in FIGS. 6B-6E. The GUI may be displayed by the computing device 1100/2100/3100, such as on a monitor of the computing device 1100/2100/3100. In the example of FIGS. 6A-6F, the GUI may be divided into multiple screens, which may be generated via, e.g., ElectronJS. The multiple screens may provide an intuitive and logical manner in which to organize the multiple pieces of electronic content that are available for provisioning mobile devices.

Figure 6A:
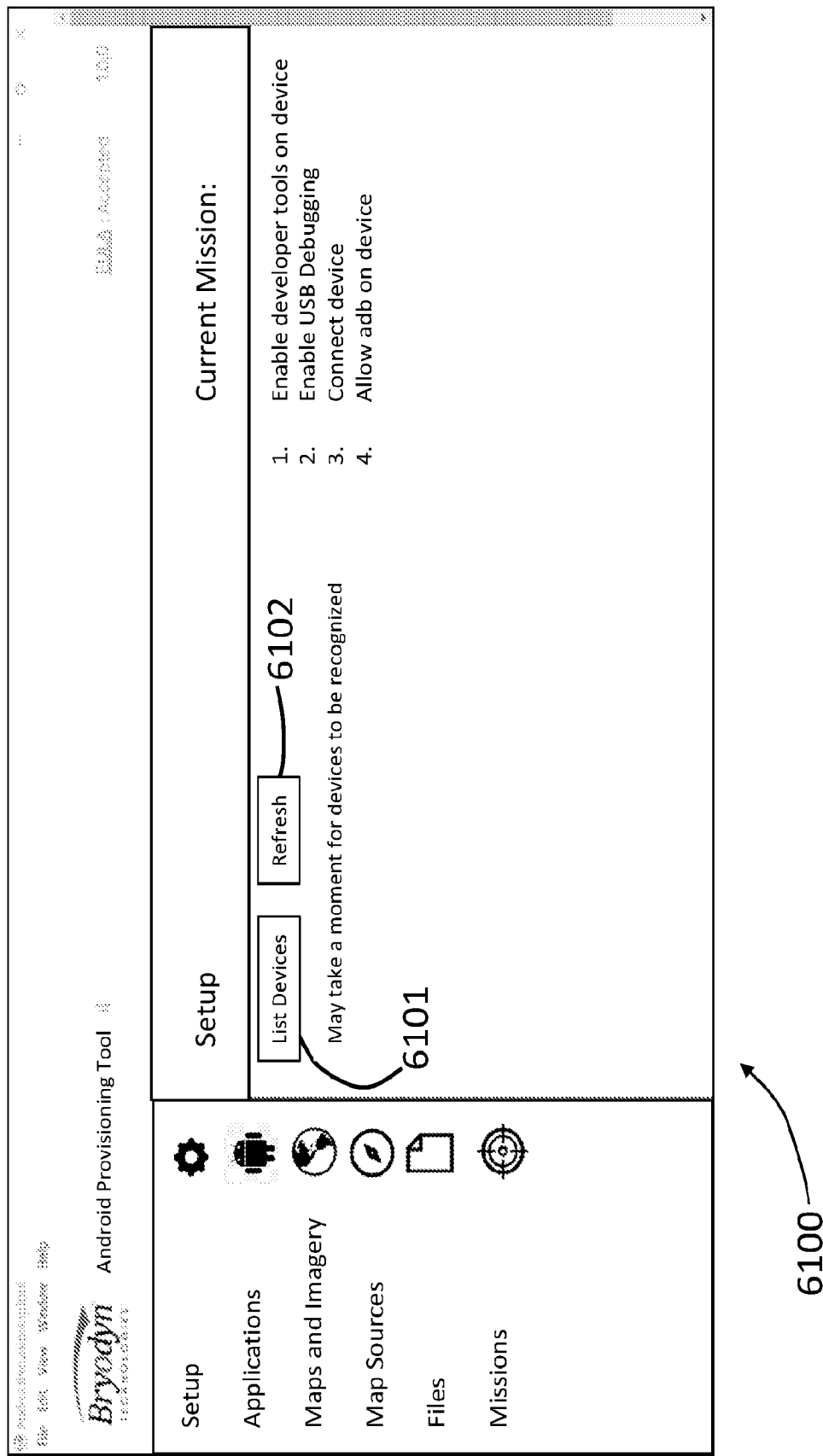
FIGS. 6A-6F illustrate example screens of a graphical user interface (GUI) which presents content identifiers that identify available pieces of electronic content for provisioning mobile devices, according to an embodiment hereof.
Figure 7:
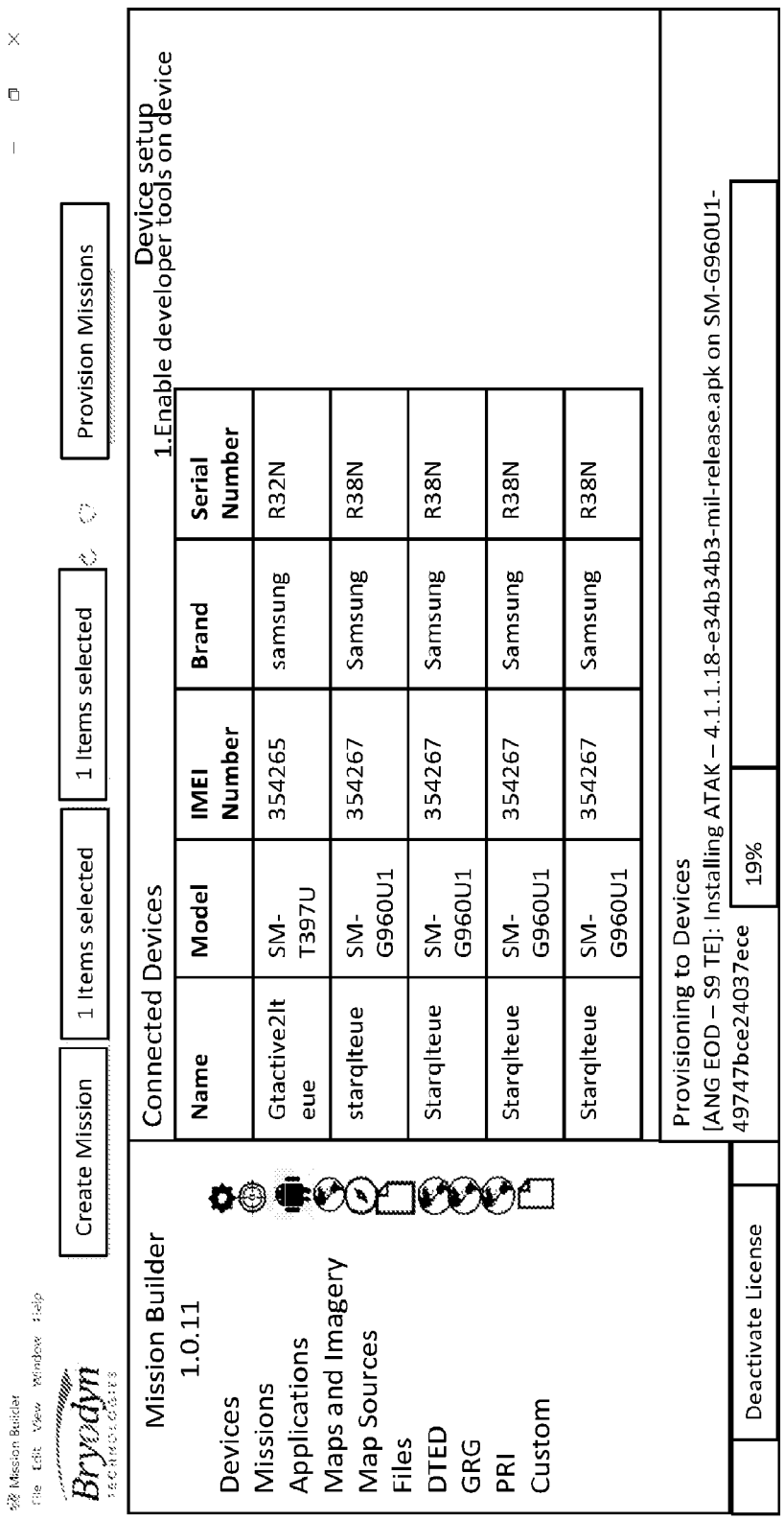
FIG. 7 illustrates an example screen of a GUI which presents a list of device identifiers of devices connected to a computing device.

For instance, FIG. 6A depicts a Setup screen 6100, which may be used to facilitate establishing a communication connection between the computing device 1100/2100/3100 and various mobile devices (e.g., $1200_1$-$1200_n$), or to request information on which mobile devices are connected to the computing device 1100/2100/3100 (e.g., connected via a USB or other peripheral device interface). For instance, FIG. 6A illustrates the Setup screen presenting user instructions for establishing the communication connection between the computing device 1100/2100/3100 and the mobile devices $1200_1$-$1200_n$. The user instructions in FIG. 6A involve establishing a connection via a USB interface, and include enabling developer tools on the computing device 1100/2100/3100 and/or the mobile devices (e.g., $1200_1$-$1200_n$), enabling USB debugging on the mobile devices, physically connecting the mobile devices directly to the computing device 1100/2100/3100 or to a peripheral communication hub (e.g., 1300), and enabling execution of Android Debug Bridge (ADB) on the computing device 1100/2100/3100 and/or mobile devices. The Setup screen may further present a button 6101 which may be invoked or pressed by a user to determine a list of mobile devices which are connected to the computing device, and present a button 6102 which may be invoked or pressed by the user to refresh the list. In some implementations, determining the list of mobile devices in response to a user pressing the button 6102 may involve the provisioning module 3121 submitting a query for a list of connected mobile devices, as discussed below in more detail. FIG. 7 illustrates a list of mobile devices which may be presented in response to receiving user input at the button 6101.

Figure 6B:
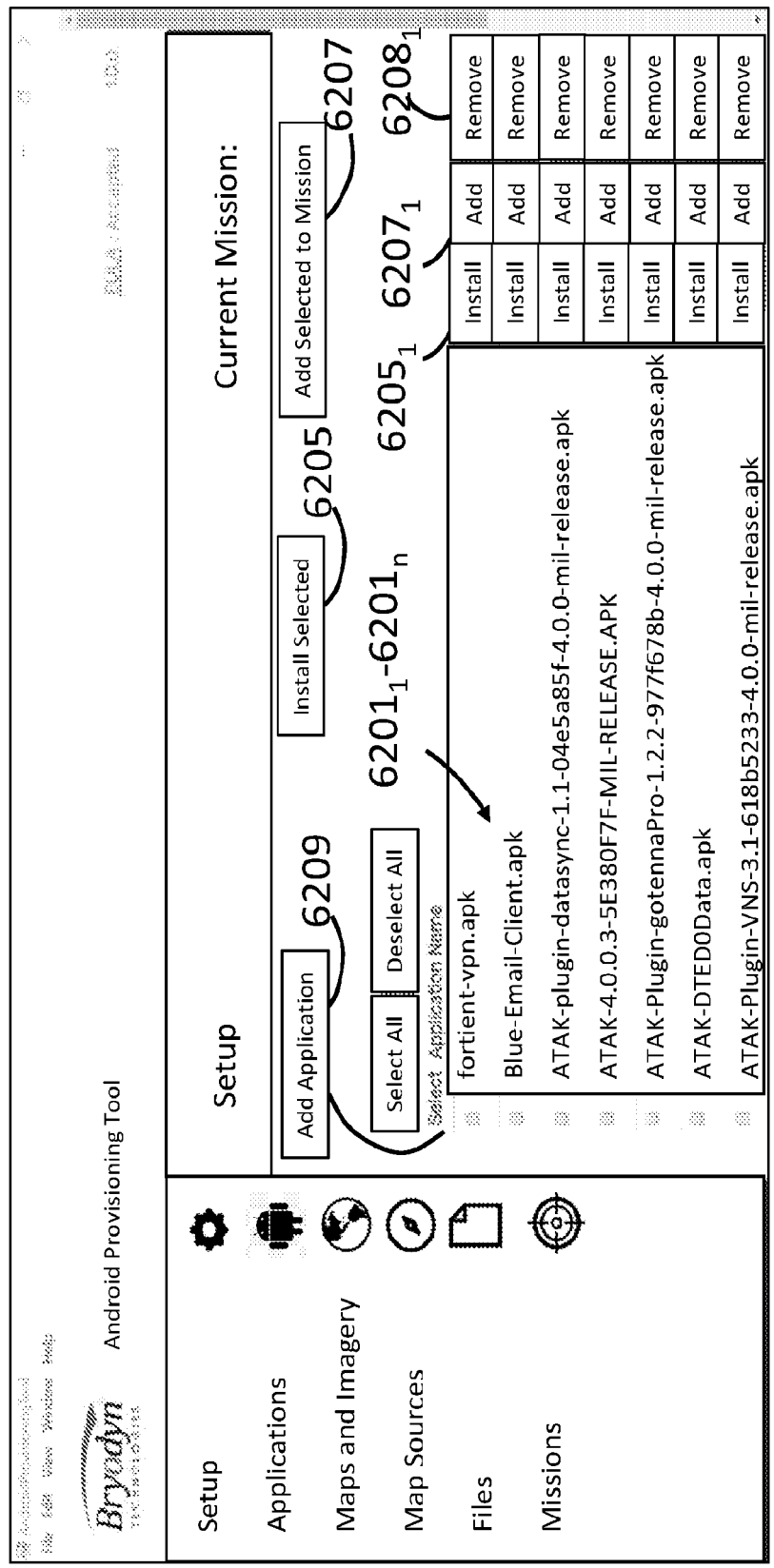

FIG. 6B illustrates an Applications page or screen 6200 of the GUI which presents content identifiers $6201_1$-$6201_n$ for application files, which may be files that contain code or other instructions for executing applications (also referred to as apps) on the mobile devices (e.g., $1200_1$-$1200_n$). For instance, the content identifiers $6201_1$-$6201_n$ may include file names for various Android™ Package (.apk) files which are available for installation on mobile devices. The content identifiers $6201_1$-$6201_n$ may be identified from, e.g., the pool of content identifiers in the database described in FIGS. 3C and 3D, by querying the database to retrieve those content identifiers associated with an Application content type. As an example, FIG. 6B illustrates content identifiers which identify apk files for an Android™ Tactical Assault Kit (ATAK) app, the Blue E-mail client app, and the Fortient VPN app. Other examples of the apps which may be identified through content identifiers on the Applications screen 6200 include CivTAK, various plugins, APAS, KillSwitch, Adobe PDF, Word, Excel, Mail Client, Samsung Secure Settings, and/or Internet Browsers. In some cases, the content identifiers $6201_1$-$6201_n$ may include or may be associated with a storage location, such as a file path, at which the corresponding pieces of electronic content are located.

FIG. 6B further illustrates Install buttons (e.g., $6205_1$), which may be used by a user to directly trigger installation of a corresponding application file on one or more mobile devices. As discussed below in more detail, the provisioning module 3121 may generate ADB commands, such as "adb install", to trigger installation of the corresponding application file. The figure further illustrates Add buttons (e.g., $6207_1$) and Remove buttons (e.g., $6208_1$). Each of the Add buttons may add a corresponding piece of electronic content to a particular content collection, while each of the Remove buttons may remove the corresponding piece of electronic content from the content collection. When a user presses the Add button or the Remove button, the computing device 1100/2100/3100 may update, via the database sub-module 3121B, a database which identifies content collections and membership of those collections. The figure further illustrates an Install Selected button 6205, which may be used to directly install a group of application files which have been selected by a user via checkboxes. FIG. 6B similarly depicts an Add Selected to Mission button 6207, which may add a group of selected application files to a content collection. The figure additionally includes an Add Application button 6209, which may be used by a user to add pieces of electronic content, or more specifically their content identifiers, to the database, wherein the content identifiers in the database represent the pool of electronic content available for provisioning mobile devices.

Figure 6C:

FIG. 6C depicts a Maps and Imagery screen 6300 of the GUI that identifies content identifiers 6301$_1$-6301$_n$ of various map image files or map imagery database files (e.g., CIB, MrSID, Sqlite, GeoTiff, CADRG) that are available for provisioning mobile devices. In some instances, the provisioning module 3121, or more specifically the database sub-module 3121B, may query the database of FIGS. 3C and 3D to retrieve those content identifiers having a content type of Map Imagery Database file, and output the retrieved content identifiers to the GUI sub-module 3121A, which may present them on the Maps and Imagery screen 6300. In the example of FIG. 6C, the map image files or map imagery database files may be SQLite files. Further, the Maps and Imagery Screen 6300 may present upload buttons (e.g., 6305$_1$), which may be clicked by a user to request transfer of a corresponding file or other piece of electronic content to one or more mobile devices, and may present an Upload Selected button 6305, which may be clicked by a user to request transfer of pieces of electronic content that were selected via checkboxes or some other selection mechanism. As discussed below in more detail, the provisioning module 3121 may in some embodiments use ADB commands, such as "adb push", to execute this transfer. The screen 6300 may further include Add buttons (e.g., 6307$_1$), Remove buttons (e.g., 6308$_1$), and an Add Selected to Mission button 6307, which may be similar to the buttons 6207$_1$, 6208$_1$, and 6207 discussed above with respect to FIG. 6B. The example in FIG. 6C further depicts an Add Imagery button 6309, which may be used by a user to add more SqlLite files or other map image database files to a pool of electronic content which is available for provisioning mobile devices. More particularly, pressing the button 6309 may cause the file names or other content identifiers of these map image files to be added to the database discussed above.

Figure 6D:
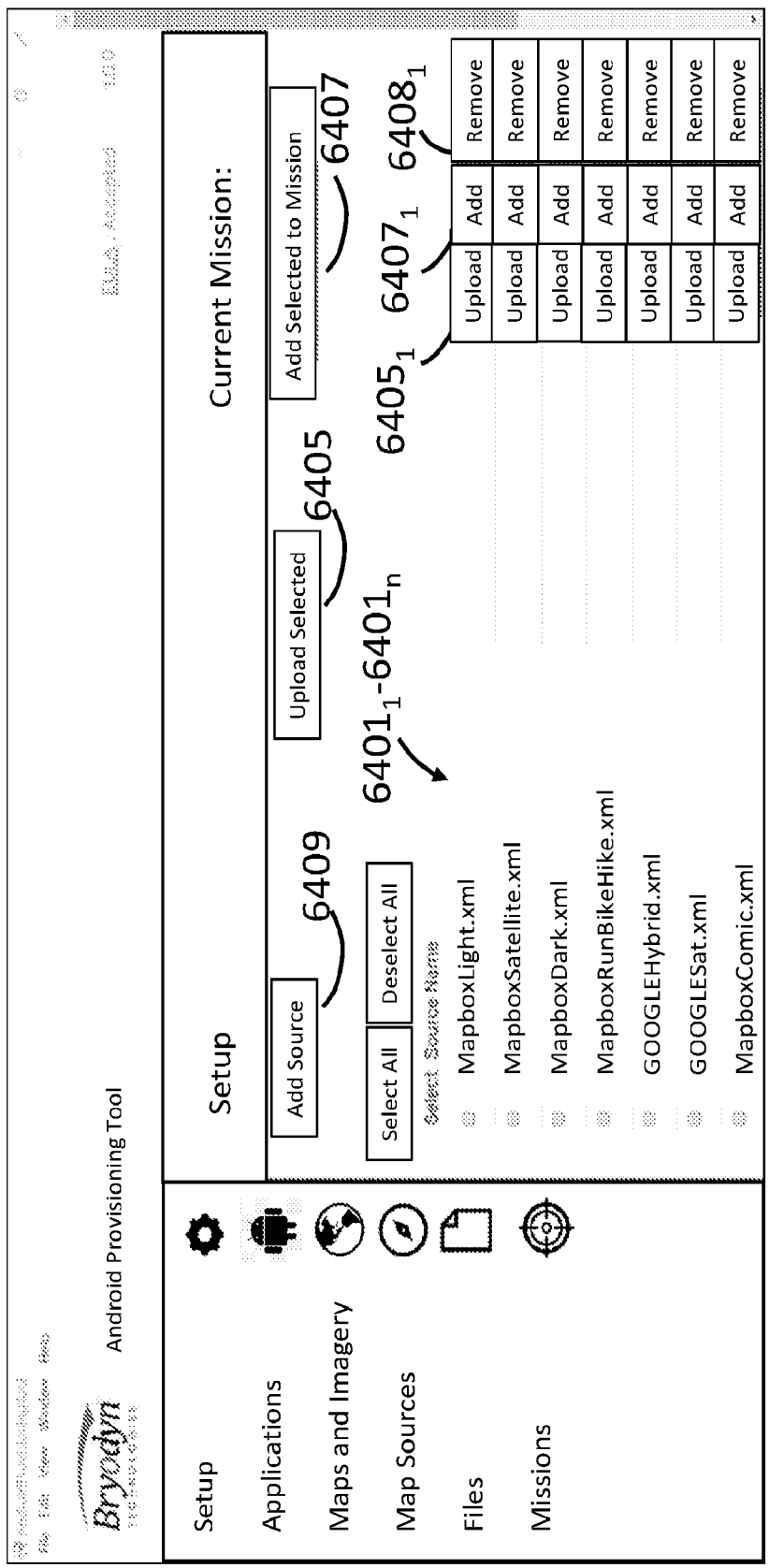
Figure 6E:
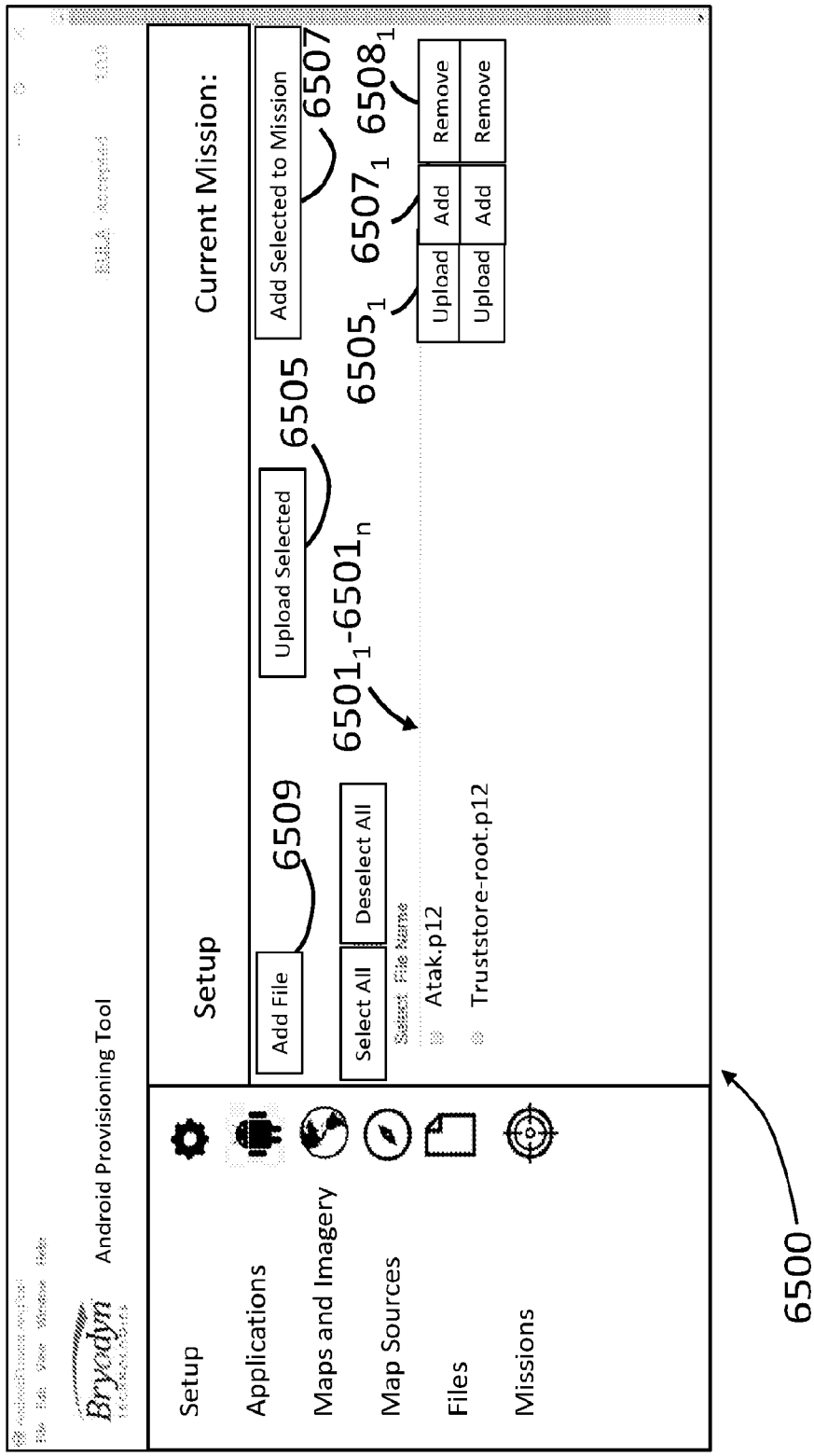

FIG. 6D depicts a Map Sources screen 6400 of the GUI, while FIG. 6E illustrates a Files screen 6500 of the GUI. The Map Sources screen 6400 may present content identifiers 6401$_1$-6401$_n$ which identify various map source files (e.g., for map sources from Google, MapBox, Bing, and/or OpenStreetMaps) or other extensible markup language (XML) files available for provisioning mobile devices, while the File screen 6500 may present content identifiers 6501$_1$-6501$_n$ which identify other files (e.g., digital certificates, Word files, Excel files, Powerpoint files, PDF files) for provisioning mobile devices. The content identifiers 6401$_1$-6401$_n$ may be retrieved from the database of FIG. 3C, based on a query for those content identifiers in the database having a content type of Map Source File, while the content identifiers 6501$_1$-6501$_n$ may be retrieved from the database based on a query for those content identifiers in the database having a content type of Other File.

Like in FIG. 6C, the Map Sources screen 6400 and the Files screen 6500 of FIGS. 6D and 6E may display upload buttons, such as 6405$_1$ or 6505$_1$, and Upload Selected buttons 6405 or 6505, which may receive a click or other user input to cause a corresponding file or a selected group of files to be transferred to one or more mobile devices. The screens 6400, 6500 may further include Add buttons, such as 6407$_1$ or 6507$_1$, and Remove buttons, such as 6408$_1$ or 6508$_1$, which may be clicked by a user to add a corresponding file to a particular content collection, or remove the corresponding file from the particular content collection. The screens 6400, 6500 may further present an Add Source button 6409 and an Add File button 6509, respectively, which may be clicked by a user to import additional map source files or other files to the pool of provision-able electronic content tracked by the database of FIGS. 3C and 3D.

Figure 6F:
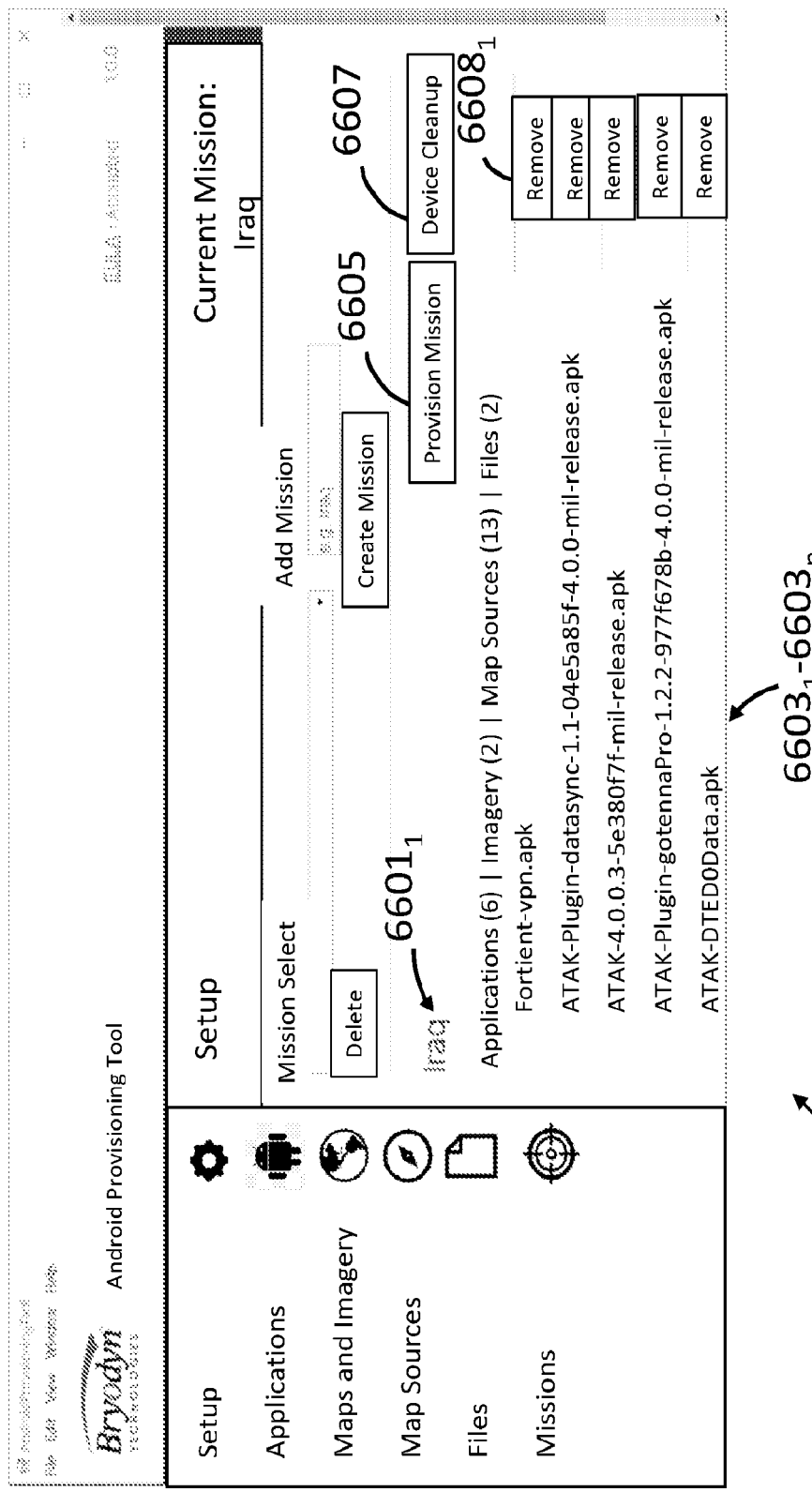

FIG. 6F illustrates a Missions screen 6600 which may be used to present various content collections (also referred to as packages) that are available for provisioning one or more mobile devices, while FIG. 7 illustrates a screen which shows progress of provisioning a list of mobile devices connected to a computing device. In some of the instances, a particular content collection may be predefined or customized to fit a particular mission. More particularly, the content collection may be designed to provide a mobile phone with applications and/or data which is relevant to the particular mission, wherein the particular mission may include, e.g., deployment of mission personnel at a particular destination, and/or fulfillment of a particular task by the mission personnel. In the example of FIG. 6F, the Missions screen 6600 may present at least one collection identifier 6601$_1$ which identifies a particular content collection. The screen may further present content identifiers, including 6603$_1$-6603$_n$, which identify pieces of electronic content which are members of the content collection. Additionally, the Missions screen 6600 may present Remove buttons, such as 6608$_1$, which may be clicked by a user to remove a corresponding piece of electronic content from the content collection.

In an embodiment, the Missions Screen may further present a Provision Mission button 6605, which may receive a user click or other input for causing one or more mobile devices to be provisioned with a particular content collection. As discussed below in more detail, the provisioning module 3121 may be configured to respond to such an input by generating commands, such as ADB commands, which would transfer or trigger transferring of pieces of electronic content in the content collection to the one or more mobile devices, and/or install or trigger installation of the pieces of the electronic content on the one or more mobile devices. The ADB commands may include "adb install" commands for installing application files, and "adb push" commands for transferring data files. As discussed below, a particular "adb install" or "adb push" command may be used with certain switches, such as the "-s" switch to indicate a serial number of a specific mobile device to which the command is directed. The module 3121 may iteratively trigger execution of a plurality of such commands, and use the "-s" switch to specify different serial numbers among such commands, so as to iteratively provision a list of mobile devices identified by the serial numbers.

In the embodiment of FIG. 6F, the screen 6600 may further present a Device Cleanup button 6607, which may receiver a click or other user input for restoring one or more mobile devices to a baseline state, before the one or more mobile devices was provisioned with various pieces of electronic content or various content collections. In some implementations, the GUI sub-module 3121B may be configured, after a device cleanup operation is complete, to cause the screen 6600 to present user instructions to disable USB debugging on the one or more mobile devices. In other instances, the provisioning module 3121 may automatically cause USB debugging to be disabled on the one or more mobile devices.

In the above examples, the GUI provided by the provisioning module may provide an intuitive and logical user interface for organizing provision-able resources and to assembling them into content collections, wherein each of the collections may include a combination of resources that are specific to a particular mission. The content collection may provide a data structure which bundles a collection of pieces of electronic content (e.g., application files and data files), and which simplifies the provisioning of mobile devices. For instance, once the content collection is defined via the GUI or in some other manner, the content collection can be re-used for the same or similar purposes. Thus, the collection may provide a way of tracking the content or other resources needed for provisioning mobile devices, and may free a user from having to manually identify or define such resources every time a provisioning process occurs. Further, the GUI allows a user to directly trigger the provisioning of a mobile device with a piece of electronic content or content collection by clicking on a button or other user interface element on the GUI.

Returning to FIG. 4, the method 4000 may in an embodiment include a step 4006, in which the computing device 1100/2100/3100, or more specifically the provisioning module 3121, receives a provisioning request associated with a piece of electronic content or associated with a content collection (also referred to as a package). The provisioning request may be a request for the piece of electronic content or the content collection to be transferred to one or more mobile devices in a manner that makes the content available for use on the one or more mobile devices. In an embodiment, the provisioning request may be received from a user from a GUI, such as the GUI illustrated in FIGS. 6A-6F. In some instances, the provisioning request may be generated based on a user input received via one or more of the Install buttons (e.g., 6205, $6205_1$, 6305, $6305_1$, etc.), which may be clicked by a user, and/or based on user input received via the Provision Mission button 6605 being clicked. As stated above, the provisioning request may be associated with a specific piece of electronic content selected from the pool of multiple pieces of electronic content that are available for provisioning, or may be associated with a specific content collection. For instance, if the provision request is in response to receiving a click of button $6205_1$, the provision request may be associated with the application file "fortientvpn.apk" that corresponds to the button $6205_1$. In another example, if the provisioning request is in response to receiving a click of the Provision Mission button 6605, then the provisioning request may be associated with a currently selected content collection, such as the content collection identified by collection identifier $6601_1$. The content collection may be a subset of the pool of multiple pieces of electronic content which is available for provisioning.

In an embodiment, the method 4000 may include a step 4008 in which the computing device 1100/2100/3100, or more specifically the provisioning module 3121, makes a query for a list of mobile devices connected to the computing device 1100/2100/3100. FIG. 7 depicts an example of a list of mobile devices connected to the computing device. The list may include all mobile devices, or more specifically their device identifiers (e.g., serial number) which are in communication with the computing device 1100/2100/3100, or more specifically all mobile devices which are connected to the computing device via a wired communication interface, or alternatively all mobile devices which are connected to the computing device wirelessly. In an embodiment, the wired communication interface may be a peripheral communication interface, such as a USB interface, such that the query may be used to determine a list of all mobile devices which are connected to the computing device 1100/2100/3100 via the USB interface. For instance, step 4008 may involve determining a list of serial numbers that identify the mobile devices $2200_1$-$2200_n$ of FIG. 2, which may be connected to the computing device 2100 via a USB interface.

In some implementations, the provisioning module 3121 may be querying a hardware or software component which is managing peripheral devices, such as an operating system of the computing device 1100/2100/3100, or a peripheral device management module (e.g., USB controller) of the computing device 1100/2100/3100 for the list of mobile devices that are connected to the computing device 1100/2100/3100 via a USB interface or other wired connection interface. In some implementations, if the mobile devices that need provisioning are executing an Android™ operating system, the provisioning module 3121 may generate one or more ADB commands to perform step 4006. For instance, the module 3121 may generate an "adb devices" command, and output the "adb devices" command to the ADB module 3123A, which may execute the "adb devices" command to determine a list that identifies all Android™ devices connected to the computing device 1100/2100/3100, or more specifically identifies serial numbers of the connected mobile devices.

In an embodiment, the method 4000 may include steps 4010-4014, in which the computing device 1100/2100/3100, or more specifically the provisioning module 3121, may provision the list of mobile devices of step 4008 with the selected piece of electronic content or content collection of step 4006. The steps 4010-4014 include a step 4012, in which the computing device 1100/2100/3100 provisions a first mobile device (e.g., $1200_1$/$2200_1$) in the list, wherein the first mobile device is provisioned with the selected piece of electronic content or the content collection. Provisioning the first mobile device may involve transferring the selected piece of electronic content or the content collection to the first mobile device in a manner which causes the piece of electronic content or the content collection to be available for use on the first mobile device.

For example, if the selected piece of electronic content is an application file, or the content collection includes an application file, then provisioning the first mobile device may involve transferring the application file to the first mobile device, and then causing the first mobile device to install the application file. In some implementations, the provisioning module 3121 may be configured to generate a set of one or more commands which include an "adb install" command for installing the application file, and may cause the ADB module 3123 to execute or trigger execution of the "adb install" command.

If the selected piece of electronic content is a data file, or the content collection includes a data file, then provisioning the first mobile device may involve transferring the data file to the first mobile device. In some implementations, the provisioning module 3121 may be configured to generate a set of one or more commands which include an "adb push" command for transferring the data file, and may cause the ADB module 3123 to execute or trigger execution of the one or more commands. If the provisioning request includes a content collection which has both application files and data files, then the set of one or more commands may include at least one "adb install" command and at least one "adb push" command.

In the above example, the "adb install" command and/or "adb push" command may include a device identifier for a particular mobile device being provisioned. For instance, if the provisioning module 3121 is provisioning mobile device $1200_1$ in step 4010, the module 3121 may include a serial number of the mobile device $1200_1$ in the "adb install" command and/or "adb push" command, so as to execute or trigger execution of an "adb install" command having the form of "adb -s [serial number] install [file name]", and/or execute or trigger execution of an "adb push" command having the form of "adb -s [serial number] push [file name]". In an embodiment, the provisioning module 3121 may generate a command which allows re-installation to take place on a mobile device. For instance, the module may generate an "adb install" command which includes a "-r" switch, which allows an application installation process on a mobile device to continue without error even if an application (e.g., an older version) is already installed. In some instances, the provisioning module 3121 may be configured to vary the commands that are generated for a particular mobile device based on what operating system version (e.g., Android™ version) is being executed on the mobile device.

In an embodiment, the method 4000 may include a step 4012 in which the computing device 1100/2100/3100, or more specifically the provisioning module 3121, may perform after the first mobile device has been provisioned with the selected piece of electronic content or content collection. In step 4012, the provisioning module 3121 may determine whether, after the first mobile device has been provisioned with the selected piece of electronic content or content collection, whether the list has one or more remaining mobile devices which have not been provisioned with the selected piece of electronic content or content collection. For example, if the list of mobile devices is $1200_1$-$1200_n$, then the provisioning module 3121 may determine, after the module has provisioned mobile device $1200_1$, that the list still has mobile devices $1200_2$-$1200_n$ that have not yet been provisioned with the selected piece of electronic content or content collection.

In some implementations, the provisioning module 3121 may perform step 4012 as part of iterating through a list of mobile devices connected to the mobile computing device 1100/2100/3100, or as part of iteratively provisioning the list of mobile devices (also referred to as sequentially provisioning the list of mobile devices). This process may involve determining whether, after the first mobile device has been provisioned with a particular piece of electronic content or content collection, there is one or more remaining mobile devices which have not been provisioned with that content or content collection, and sequentially provisioning the one or more remaining mobile devices with that content or content collection.

More specifically, the provisioning module 3121 may perform step 4012 to determine if the list still has at least one un-provisioned mobile device. For example, if the module 3121 has provisioned mobile device $1200_1$ with a piece of electronic content or content collection, the module 3121 may in step 4012 determine that the list has a next mobile device $1200_2$ which is un-provisioned with that content. If there is at least one un-provisioned mobile device in the list, the provisioning module 3121 may perform step 4014, in which the module 3121 provisions the un-provisioned mobile device, such as mobile device $1200_2$. As stated above, this provisioning may involve transferring the piece of electronic content or content collection to the mobile device $1200_2$ in a manner which causes that content to be available for use on the mobile device $1200_2$. In some implementations, if provisioning the mobile device $1200_1$ involved generating and executing a set of commands, such as a combination of "adb install" and "adb push" commands, the same set of commands may be executed to provision other mobile devices in the list, such as mobile device $1200_2$. Like the discussion of step 4010, if the "adb install" command or "adb push" command is used to provision a particular mobile device, such as mobile device $1200_2$, the command may include a device identifier, such as a serial number of mobile device $1200_2$.

After the provisioning module performs step 4014, it may repeat step 4012 to determine if the list of mobile devices still has at least one un-provisioned mobile device. For instance, after mobile devices $1200_1$ and $1200_2$ have been provisioned with the piece of electronic content or content collection, the module 3121 may determine that the list includes a mobile device $1200_3$ which still has not been provisioned. In such a situation, the module 3121 may also repeat step 4014 to provision the mobile device $1200_3$ with the piece of electronic content or content collection. As a result, the provisioning module 3121 may perform steps 4012 and 4014 multiple times, over multiple iterations, to automatically provision a list of mobile devices with the piece of electronic content or content collection. More particularly, if the list includes all mobile devices or all Android™ mobile devices connected to the computing device 1100/2100/3100 via a wired communication interface (e.g., USB interface), the provisioning module 3121 may perform steps 4010-4014 to automatically provision all mobile devices or all Android™ mobile devices which are connected to the computing device 1100/2100/3100 via the wired communication interface.

During or after a last iteration of step 4012, the provisioning module 3121 may determine that the list has no remaining device which is un-provisioned with respect to a particular piece of content or content collection. For example, after the provisioning module 3121 provisions mobile device $1200_n$ with a piece of electronic content or content collection, it may determine that the list has no more remaining mobile devices to provision with that content. As a result, the provisioning module 3121 may proceed to step 4016, by presenting a message on the GUI that indicates completion of the provisioning of the list of mobile devices.

As stated above, the provisioning module 3121 may be able to import new pieces of electronic content into a pool of electronic content used for provisioning mobile devices. For instance, the provisioning module 3121 may perform this functionality in response to the GUI of FIGS. 6A-6F receiving a user input via buttons 6209, 6309, 6409, or 6509 to add pieces of electronic content to the pool. In an embodiment, when the provisioning module 3121 is importing new pieces of electronic content, it may be configured to rename their file names or other content identifiers. More particularly, some applications, such as the Android Team Awareness Kit (ATAK), may require some of the pieces of the electronic content used by the applications to have a specific name format, and/or to be located in a specific folder in a file system of a mobile device. When the provisioning module 3121 is importing new pieces of electronic content, such as new digital terrain and elevation data files (e.g., DTED files), these new files may be unusable by the applications discussed above unless the files have the proper name format and are located in the specific folder. Thus, when the provisioning module 3121 is importing the new files, the module may be configured to rename the files by adjusting their file names to generate adjusted file names. These adjusted file names may identify the imported files, which may be used by a predefined application, such as ATAK. As a result, when a mobile device is provisioned, these files may be transferred to the mobile device. Because the transferred files have been renamed, the mobile device may store these files with the adjusted file names, which may cause these files to be usable by the predefined application.

In an embodiment, the provisioning module 3121 may facilitate provisioning of removable storage devices, such as secure digital (SD) card, with electronic content, wherein the removable storage devices may be attached mobile devices when they are being provisioned. In some situations, such as when a mobile device has certain versions of the Android™ operating system, the mobile device may dynamically assign a mount point (also referred to as file system mount point) or file path to assign to a removable storage device after this storage device is attached to the mobile device. In such situations, the provisioning module may query the mobile device to determine a file system mount point at which the removable storage device (e.g., SD card) is mounted to a file system of the mobile device. For example, the query may cause the provisioning module to determine that the SD card is mounted to "\mount\ABCD12345" in a file system of the mobile device. In this embodiment, if the provisioning module 3121 receives a user command to provision the SD card or other removable storage device, the module 3121 may be configured to generate commands (e.g., "adb push" commands) which specify the determined file system mount point of the SD card. Thus, the provisioning module 3121 may allow a user to easily provision removable storage devices that are attached to mobile devices, without requiring user knowledge of the mount points of the SD cards, wherein the mount points may be dynamic and different among different mobile devices. In some instances, the removable storage device may be encrypted. That is, although an SD card duplicator may be used to provision SD cards in this situation, such a technique may require data on the SD card to be decrypted. The technique discussed above involving the provisioning module 3121 querying for a file system mount point, on the other hand, may work even on encrypted SD cards, and thus may be used to provision encrypted SD cards.

In an embodiment, method 4000 of FIG. 4 may involve provisioning mobile devices which are connected to a computing device via a wired communication interface, such as a USB interface. The provisioning may be done alternatively or additionally via a wireless communication network. This may be done by connecting a computing device 1100/2100/3100 and a group of mobile devices to the same wireless communication network. The mobile devices may further be temporarily connected to the computing device via a wired communication interface. This allows execution of certain adb commands for defining a TCP/IP port for wireless communication between the computing device and the mobile devices, and for determining IP addresses of the mobile devices. These adb commands may include "adb tcpip [predefined port number]", "adb shell ip addr show wlan0", and "adb connect [IP address of device: predefined port number]." After these command are executed, the computing device may be able to wirelessly communicate with the mobile devices via a network port, and can be disconnected from the wired communication interface. The provisioning may then occur over the wireless communication network.

FIG. 5 illustrates a method 5000 for provisioning mobile devices over a wireless communication network. The method may involve some of the steps of method 4000, such as steps 4002, 4004, and 4006. These steps involve determining a set of content identifiers, generating a GUI that presents the content identifiers, and receiving a provisioning request. In an embodiment, method 5000 may further include a step 5008, in which the computing device 1100/2100/3100, or more specifically the provisioning module 3121, receives a list of network addresses assigned to a list of mobile devices, such as a list of Android™ devices. The list of mobile devices may include mobile devices which are intended or identified by a user to be provisioned with a piece of electronic content or content collection associated with the provisioning request. In some instances, the list of network addresses may be a list of internet protocol (IP) addresses.

In an embodiment, the method 5000 may include establishing a wireless connection with the list of mobile devices via a wireless communication network, such as the network 1500 of FIG. 1E. The network 1500 may be, e.g., an IEEE 802.11 (Wi-Fi®) network to which the computing device 1100/2100/3100 is connected. For example, the provisioning module 3121 may generate "adb connect" commands which specify the IP addresses from step 5008. The provisioning module 3121 may execute or trigger execution of the "adb connect" commands to cause the computing device 1100/2100/3100 to be connected to the mobile devices, or more specifically to the IP addresses assigned to those devices. After step 5009 is performed, the method 5000 may provision the mobile devices using steps 4010 through 4016, which are discussed above with respect to FIG. 4.

In some situations, the wireless connection for provisioning mobile devices may occur over a predefined computer networking port. Such a computer networking port may be a software communication endpoint associated with a specific process or type of network service. In the situations involving a predefined computer networking port, the method 5000 may include a step in which the provisioning module 3121 executes or triggers execution of an "adb tcpip" command, to cause mobile devices to activate or listen to the predefined computer networking port, such as port 5555. In some implementations, the "adb tcpip" command may be executed while the mobile devices are connected to the computing device 1100/2100/3100 via a wired communication interface (e.g., USB interface). After the "adb tcpip" command is executed, the mobile devices may be disconnected from the wired communication interface, and the wireless communication network may be used to provision the mobile devices.

In an embodiment, the provisioning module 3121 may provide a device cleanup functionality, which may be performed in response to, e.g., receiving a user input via the Device Cleanup button 6607 of FIG. 6F. The provisioning module 3121 may, in response, generate commands for triggering removal of a piece of electronic content or a content collection with which a mobile device was previously provisioned. For instance, the module 3121 may generate one or more "adb uninstall" commands and/or "adb shell rm" commands, and trigger execution of those commands by outputting the commands to the ADB module 3123. In some cases, the provisioning module 3121 may perform the device cleanup functionality in a manner that causes the mobile devices to clear their cached settings, which may cause the mobile devices to revert to a default state in which Developer Options and USB debugging is disabled. This functionality may enhance a security of the mobile devices, because disabling USB debugging may reduce certain security vulnerabilities in the mobile devices.

In an embodiment, the provisioning module 3121 may perform the device cleanup by executing a specific set of commands to reset an Android™ configuration file for USB debugging and for developer options. Further, the module 3121 may execute the commands in a specific sequence. For instance, if the module 3121 turns off developer options before disabling USB debugging, such a sequence may create a situation in which developer options on a mobile device appear to be off to a user, but USB debugging is still on. This may create a security problem in which the user may believe the mobile device to be secure, but the mobile device is in fact vulnerable to certain data extraction tools, such as CelleBrite, which may circumvent operating system security and extract private data from the mobile phone. Thus, the module may disable USB debugging before turning off developer options.

While the above discussion involves provisioning Android™ mobile devices, the provisioning tool may be configured to automate provisioning for other types of mobile devices, such as devices running the iOS operating system. For instance, the provisioning may be performed in a similar manner for iOS devices, and may involve the provisioning module outputting commands to a mobile device interface module which is configured to interface with iOS devices.

Additional Discussion of Various Embodiments

Embodiment 1 relates to a method and a computing system for provisioning mobile devices with electronic content. The method comprises determining a set of content identifiers which identify multiple pieces of electronic content, wherein each of the multiple pieces of electronic content is a respective application file or data file; generating a graphical user interface (GUI) that presents the set of content identifiers which identify the multiple pieces of electronic content; receiving, from a user via the GUI, a provisioning request associated with a piece of electronic content selected from the multiple pieces of electronic content, or associated with a content collection which has a subset of the multiple pieces of electronic content, wherein the provisioning request is for requesting the piece of electronic content or the content collection to be available for use on one or more mobile devices. The method further comprises querying, in response to receiving the provisioning request, the computing device for a list of mobile devices which identify all mobile devices connected to the computing device via a wired communication interface. The method further comprises provisioning the list of mobile devices with the selected piece of electronic content or the content collection by: (a) provisioning a first mobile device in the list with the selected piece of electronic content or the content collection by transferring, via the wired communication interface, the piece of electronic content or content collection to the first mobile device in a manner which causes the piece of electronic content or content collection to be available for use on the first mobile device; (b) determining, after the first mobile device has been provisioned with the piece of electronic content or content collection, whether the list has one or more remaining mobile devices which have not been provisioned with the piece of electronic content or content collection; and (c) in response to a determination that the list includes the one or more remaining mobile devices which have not been provisioned, sequentially provisioning the one or more remaining mobile devices with the piece of electronic content or content collection by transferring, via the wired communication interface, the piece of electronic content or content collection to the one or more remaining mobile devices in the manner which causes the piece of electronic content or content collection to be available for use on the one or more remaining mobile devices.

Embodiment 2 includes the method of embodiment 1, wherein the selected piece of electronic content or the content collection includes a first application file, and wherein provisioning the first mobile device with the selected piece of electronic content or the content collection includes transferring the first application file to the first mobile device and causing the first mobile device to install the first application file, and wherein sequentially provisioning the one or more remaining mobile devices with the selected piece of electronic content or content collection include transferring the first application file to the one or more remaining mobile devices and causing the one or more remaining mobile devices to install the first application file.

Embodiment 3 includes the method of embodiment 1 or 2, wherein the selected piece of electronic content or the content collection includes a first data file, and wherein provisioning the first mobile device with the selected piece of electronic content or content collection includes transferring the first data file to a destination file path on the first mobile device, and wherein provisioning the one or more remaining mobile devices with the selected piece of electronic content or content collection include transferring the first data file to the destination file path on the one or more remaining mobile devices.

Embodiment 4 includes the method of any one of embodiments 1-3, wherein provisioning the first mobile device with the selected piece of electronic content or content collection includes generating a set of one or more commands which include an application install command or data copy command, and executing or triggering execution of the one or more commands, and wherein sequentially provisioning the one or more remaining mobile devices with the selected piece of electronic content or content collection includes executing or triggering execution of the set of one or more commands again for each mobile device of the one or more remaining mobile devices.

Embodiment 5 includes the method of embodiment 4, wherein each mobile device of the list of one or more mobile devices is a mobile phone executing an Android™ operating system, and wherein the set of one or more commands include Android Debug Bridge (ADB) commands. Embodiment 6 includes the method of embodiment 5, wherein the adb commands include an adb install command or an adb push command, and wherein triggering execution of the adb commands include causing an ADB module on the computing device to communicate the adb commands to each of the list of mobile devices.

Embodiment 7 includes the method of embodiment 6, wherein the wired communication interface is a universal serial bus (USB) interface, such that provisioning the list of mobile devices with the selected piece of electronic content or content collection includes automatically provisioning all mobile devices connected to the computing device via the USB interface.

Embodiment 8 includes the method of embodiment 7, and wherein the method further comprises: presenting, before the list of mobile devices are provisioned, a first message on the GUI for enabling USB debugging on the list of mobile devices; and presenting, after the list of mobile devices are provisioned, a second message on the GUI for disabling USB debugging on the list of mobile devices.

Embodiment 9 includes the method of any one of embodiments 1-8, wherein the set of content identifiers are a set of file names, and wherein the method comprises renaming files by adjusting file names in the set to generate adjusted file names, wherein the adjusted file names identify files which are used by a predefined application, and wherein provisioning the list of mobile devices include transferring the files to the list of mobile devices after the files have been renamed, such that the files are stored on the list of mobile devices with the adjusted file names.

Embodiment 10 includes the method of any one of embodiments 1-9, further comprising storing, on the computing device, a database which identifies a plurality of content collections and which pieces of electronic content are in each of the plurality of content collections.

Embodiment 11 includes the method of embodiment 10, further comprising: receiving, from the user via the GUI, a collection expansion request which identifies a content collection of the plurality of content collections and identifies one or more pieces of electronic content to be added to the content collection; and updating the database, in response to the collection expansion request, to indicate the identified one or more pieces of electronic content as being part of the content collection.

Embodiment 12 includes the method of any one of embodiments 1-11, wherein the GUI is divided into multiple screens for presenting different respective types of electronic content, wherein the different respective types of electronic content include application files, database files which associate map and imagery, and map source files.

Embodiment 13 includes the method of any one of embodiments 1-12, wherein at least one mobile device of the list of mobile devices includes a removable storage device, and wherein the method further comprises: querying the at least one mobile device to determine a file system mount point at which the removable storage device is mounted to a file system of the at least one mobile device; receiving a user request for provisioning the removable storage device of the at least one mobile device with one or more pieces of electronic content; generating, in response to the user request, a command for transferring the one or more pieces of electronic content to the removable storage device, wherein the command is generated based on the file system mount point; and executing or triggering execution of the command to cause the removable storage device to be provisioned with the one or more pieces of electronic content.

Embodiment 14 includes a method and a computing device for provisioning mobile devices with electronic content. The method comprises: determining a set of content identifiers which identify multiple pieces of electronic content; generating a graphical user interface (GUI) that presents the set of content identifiers which identify the multiple pieces of electronic content; receiving, from a user via the GUI, a provisioning request associated with a piece of electronic content, or associated with a content collection which has a subset of the multiple pieces of electronic content, wherein the provisioning request is for causing the piece of electronic content or the content collection to be available for use on one or more mobile devices; receiving a list of network addresses which are assigned to a list of mobile devices, wherein the list of network addresses are associated with a wireless communication network; establishing a wireless connection with the list of mobile devices via the wireless communication network; provisioning the list of mobile devices with the selected piece of electronic content or the content collection by: (a) provisioning a first mobile device in the list with the selected piece of electronic content or the content collection by transferring, via the wireless communication network, the piece of electronic content or content collection to the first mobile device in a manner which causes the piece of electronic content or content collection to be available for use on the first mobile device; (b) determining, after the first mobile device has been provisioned with the piece of electronic content or content collection, whether the list has one or more remaining mobile devices which have not been provisioned with the piece of electronic content or content collection; and (c) in response to a determination that the list includes the one or more remaining mobile devices, sequentially provisioning the one or more remaining mobile devices with the piece of electronic content or content collection by transferring, via the wireless communication network, the piece of electronic content or content collection to the one or more remaining mobile devices in the manner which causes the piece of electronic content or content collection to be available for use on the one or more remaining mobile devices.

Embodiment 15 includes the method of embodiment 14, wherein the list of network addresses are a list of internet protocol (IP) addresses. Embodiment 16 includes the method of embodiment 15, wherein each mobile device of the list of mobile devices is a mobile phone executing an Android™ operating system, and wherein establishing the wireless connection includes generating a plurality of Android Debug Bridge (ADB) connect commands, and executing or triggering execution of the plurality of adb connect commands. Embodiment 17 includes the method of embodiment 16, further comprising executing or triggering execution of an adb tcpip command via a wired communication interface before establishing the wireless connection with the list of mobile devices.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer only to alternatives or the alternatives are mutually exclusive, although the disclosure supports a definition that refers to only alternatives and "and/or." As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited, elements or method steps. While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or statistical models of the different embodiments described.

What is claimed is:

1. A method for provisioning mobile devices with electronic content, the method being performed by a computing device and comprising:
   determining a set of content identifiers which identify multiple pieces of electronic content that are stored on the computing device or are accessible by the computing device, wherein each of the multiple pieces of electronic content is a respective application file or data file;
   generating a graphical user interface (GUI) that presents the set of content identifiers which identify the multiple pieces of electronic content;
   receiving, from a user via the GUI, a provisioning request associated with a piece of electronic content selected from the multiple pieces of electronic content, or associated with a content collection which has a subset of the multiple pieces of electronic content, wherein the provisioning request is for requesting the piece of electronic content or the content collection to be available for use on one or more mobile devices;
   querying, in response to receiving the provisioning request, an operating system of the computing device or a peripheral device management module of the computing device for a list of mobile devices which identify all mobile devices connected to the computing device via a wired communication interface;
   provisioning the list of mobile devices with the selected piece of electronic content or the content collection by:
   (a) provisioning a first mobile device in the list with the selected piece of electronic content or the content collection by transferring, via the wired communication interface, the piece of electronic content or content collection to the first mobile device in a manner which causes the piece of electronic content or content collection to be available for use on the first mobile device;
   (b) determining, after the first mobile device has been provisioned with the piece of electronic content or content collection, whether the list has one or more remaining mobile devices which have not been provisioned with the piece of electronic content or content collection; and
   (c) in response to a determination that the list includes the one or more remaining mobile devices which have not been provisioned, sequentially provisioning the one or more remaining mobile devices with the piece of electronic content or content collection by transferring, via the wired communication interface, the piece of electronic content or content collection to the one or more remaining mobile devices in the manner which causes the piece of electronic content or content collection to be available for use on the one or more remaining mobile devices.

2. The method of claim 1, wherein the selected piece of electronic content or the content collection includes a first application file, and wherein provisioning the first mobile device with the selected piece of electronic content or the content collection includes transferring the first application file to the first mobile device and causing the first mobile device to install the first application file, and
   wherein sequentially provisioning the one or more remaining mobile devices with the selected piece of electronic content or content collection include transferring the first application file to the one or more remaining mobile devices and causing the one or more remaining mobile devices to install the first application file.

3. The method of claim 1, wherein the selected piece of electronic content or the content collection includes a first data file, and wherein provisioning the first mobile device with the selected piece of electronic content or content collection includes transferring the first data file to a destination file path on the first mobile device, and
   wherein provisioning the one or more remaining mobile devices with the selected piece of electronic content or content collection include transferring the first data file to the destination file path on the one or more remaining mobile devices.

4. The method of claim 1, wherein provisioning the first mobile device with the selected piece of electronic content or content collection includes generating a set of one or more commands which include an application install command or data copy command, and executing or triggering execution of the one or more commands, and
   wherein sequentially provisioning the one or more remaining mobile devices with the selected piece of electronic content or content collection includes executing or triggering execution of the set of one or more commands again for each mobile device of the one or more remaining mobile devices.

5. The method of claim 4, wherein each mobile device of the list of one or more mobile devices is a mobile phone executing an Android™ operating system, and
   wherein the set of one or more commands include Android Debug Bridge (ADB) commands.

6. The method of claim 5, wherein the adb commands include an adb install command or an adb push command, and wherein triggering execution of the adb commands include causing an ADB module on the computing device to communicate the adb commands to each of the list of mobile devices.

7. The method of claim 6, wherein the wired communication interface is a universal serial bus (USB) interface, such that provisioning the list of mobile devices with the selected piece of electronic content or content collection includes automatically provisioning all mobile devices connected to the computing device via the USB interface.

8. The method of claim 7, and wherein the method further comprises:
   presenting, before the list of mobile devices are provisioned, a first message on the GUI for enabling USB debugging on the list of mobile devices; and
   presenting, after the list of mobile devices are provisioned, a second message on the GUI for disabling USB debugging on the list of mobile devices.

9. The method of claim 1, wherein the set of content identifiers are a set of file names, and wherein the method comprises renaming files by adjusting file names in the set to generate adjusted file names, wherein the adjusted file names identify files which are used by a predefined application, and
   wherein provisioning the list of mobile devices include transferring the files to the list of mobile devices after the files have been renamed, such that the files are stored on the list of mobile devices with the adjusted file names.

10. The method of claim 1, further comprising storing, on the computing device, a database which identifies a plurality of content collections and which pieces of electronic content are in each of the plurality of content collections.

11. The method of claim 10, further comprising:
receiving, from the user via the GUI, a collection expansion request which identifies a content collection of the plurality of content collections and identifies one or more pieces of electronic content to be added to the content collection; and
updating the database, in response to the collection expansion request, to indicate the identified one or more pieces of electronic content as being part of the content collection.

12. The method of claim 1, wherein the GUI is divided into multiple screens for presenting different respective types of electronic content, wherein the different respective types of electronic content include application files, database files which associate map and imagery, and map source files.

13. The method of claim 1, wherein at least one mobile device of the list of mobile devices includes a removable storage device, and wherein the method further comprises:
querying the at least one mobile device to determine a file system mount point at which the removable storage device is mounted to a file system of the at least one mobile device;
receiving a user request for provisioning the removable storage device of the at least one mobile device with one or more pieces of electronic content;
generating, in response to the user request, a command for transferring the one or more pieces of electronic content to the removable storage device, wherein the command is generated based on the file system mount point; and
executing or triggering execution of the command to cause the removable storage device to be provisioned with the one or more pieces of electronic content.

14. A non-transitory computer-readable medium having instructions which, when executed by at least one processor of a computing device, causes the computing device to perform the following:
determining a set of content identifiers which identify multiple pieces of electronic content that are stored on the computing device or are accessible by the computing device, wherein each of the multiple pieces of electronic content is a respective application file or data file;
generating a graphical user interface (GUI) that presents the set of content identifiers which identify the multiple pieces of electronic content;
receiving, from a user via the GUI, a provisioning request associated with a piece of electronic content selected from the multiple pieces of electronic content, or associated with a content collection which has a subset of the multiple pieces of electronic content, wherein the provisioning request is for requesting the piece of electronic content or the content collection to be available for use on one or more mobile devices;
querying, in response to receiving the provisioning request, an operating system of the computing device or a peripheral device management module of the computing device for a list of mobile devices which identify all mobile devices connected to the computing device via a wired communication interface;
provisioning the list of mobile devices with the selected piece of electronic content or the content collection by:
(a) provisioning a first mobile device in the list with the selected piece of electronic content or the content collection by transferring, via the wired communication interface, the piece of electronic content or content collection to the first mobile device in a manner which causes the piece of electronic content or content collection to be available for use on the first mobile device;
(b) determining, after the first mobile device has been provisioned with the piece of electronic content or content collection, whether the list has one or more remaining mobile devices which have not been provisioned with the piece of electronic content or content collection; and
(c) in response to a determination that the list includes the one or more remaining mobile devices which have not been provisioned, sequentially provisioning the one or more remaining mobile devices with the piece of electronic content or content collection by transferring, via the wired communication interface, the piece of electronic content or content collection to the one or more remaining mobile devices in the manner which causes the piece of electronic content or content collection to be available for use on the one or more remaining mobile devices.

15. A method for provisioning mobile devices with electronic content, the method being performed by a computing device and comprising:
determining a set of content identifiers which identify multiple pieces of electronic content that are stored on the computing device or are accessible by the computing device, wherein each of the multiple pieces of electronic content is a respective application file or data file;
generating a graphical user interface (GUI) that presents the set of content identifiers which identify the multiple pieces of electronic content;
receiving, from a user via the GUI, a provisioning request associated with a piece of electronic content selected from the multiple pieces of electronic content, or associated with a content collection which has a subset of the multiple pieces of electronic content, wherein the provisioning request is for causing the piece of electronic content or the content collection to be available for use on one or more mobile devices;
receiving a list of network addresses which are assigned to a list of mobile devices, wherein the list of network addresses are associated with a wireless communication network;
establishing a wireless connection with the list of mobile devices via the wireless communication network, wherein the wireless connection is established based on the list of network addresses;
provisioning the list of mobile devices with the selected piece of electronic content or the content collection by:
(a) provisioning a first mobile device in the list with the selected piece of electronic content or the content collection by transferring, via the wireless communication network, the piece of electronic content or content collection to the first mobile device in a manner which causes the piece of electronic content or content collection to be available for use on the first mobile device;
(b) determining, after the first mobile device has been provisioned with the piece of electronic content or content collection, whether the list has one or more remaining mobile devices which have not been provisioned with the piece of electronic content or content collection; and
(c) in response to a determination that the list includes the one or more remaining mobile devices, sequentially provisioning the one or more remaining mobile devices with the piece of electronic content or content collection by transferring, via the wireless communication network, the piece of electronic content or content collection to the one or more remaining mobile devices in the manner which causes the piece of electronic content or content collection to be available for use on the one or more remaining mobile devices.

16. The method of claim 15, wherein the list of network addresses are a list of internet protocol (IP) addresses.

17. The method of claim 16, wherein each mobile device of the list of mobile devices is a mobile phone executing an Android™ operating system, and
   wherein establishing the wireless connection includes generating a plurality of Android Debug Bridge (ADB) connect commands, and executing or triggering execution of the plurality of adb connect commands.

18. The method of claim 17, further comprising executing or triggering execution of an adb tcpip command via a wired communication interface before establishing the wireless connection with the list of mobile devices.

\* \* \* \* \*